US012764331B2

(12) United States Patent
Ahn et al.

(10) Patent No.: US 12,764,331 B2
(45) Date of Patent: Oct. 13, 2026

(54) DYNAMIC PCC WITH MULTIPLE REFERENCE FRAMES

(71) Applicant: InterDigital VC Holdings, Inc., Wilmington, DE (US)

(72) Inventors: Junghyun Ahn, New York, NY (US); Jiahao Pang, Plainsboro, NJ (US); Muhammad Asad Lodhi, Highland Park, NJ (US); Dong Tian, Boxborough, MA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/807,746

(22) Filed: Aug. 16, 2024

(65) Prior Publication Data

US 2026/0052274 A1 Feb. 19, 2026

(51) Int. Cl.
*H04N 19/597* (2014.01)
*H04N 19/105* (2014.01)
*H04N 19/137* (2014.01)

(52) U.S. Cl.
CPC ......... *H04N 19/597* (2014.11); *H04N 19/105* (2014.11); *H04N 19/137* (2014.11)

(58) Field of Classification Search
CPC ... H04N 19/597; H04N 19/105; H04N 19/137
See application file for complete search history.

(56) References Cited

U.S. PATENT DOCUMENTS 12,471,852 B2 * 11/2025 Shamir ................ A61B 5/7275
2017/0177960 A1 * 6/2017 Boulanger ......... G06V 40/1365
2020/0148215 A1 * 5/2020 Mohajerin ........... G05D 1/0221
2021/0124564 A1 * 4/2021 Giltner ....................... G06F 8/35
2021/0196207 A1 * 7/2021 Shamir ................ A61B 5/7275
2021/0276598 A1 * 9/2021 Amirloo Abolfathi ...................... B60W 30/09
2022/0051372 A1 * 2/2022 Toft .......................... G06T 7/74
2022/0180088 A1 * 6/2022 Ye .......................... G06V 20/58
(Continued)

FOREIGN PATENT DOCUMENTS

CA 3220488 A1 1/2023
CN 113065810 A * 7/2021 ........... G06Q 10/083
(Continued)

OTHER PUBLICATIONS

Zhan, Lin-fan Translation of CN 118608782 A May 23, 2024 (Year: 2024).*
(Continued)

*Primary Examiner* — Zaihan Jiang
(74) *Attorney, Agent, or Firm* — Klintworth & Rozenblat LLP

(57) ABSTRACT

Some embodiments of a method may include: obtaining one or more motion bitstreams; decoding one or more motion features corresponding to the one or more motion bitstreams; obtaining one or more reference features corresponding to the one or more motion features; generating, via a set of neural network layers, one or more predicted
(Continued)

features corresponding to the one or more motion features and the one or more reference features; merging, via another set of neural network layers, the one or more predicted features into a merged feature; and reconstructing a point cloud based on the merged feature.

20 Claims, 18 Drawing Sheets

(56) References Cited

U.S. PATENT DOCUMENTS

| | | | | |
|---|---|---|---|---|
| 2024/0187687 | A1 * | 6/2024 | Ortega Pena | H04N 21/44218 |
| 2024/0249475 | A1 * | 7/2024 | Jindal | G06T 7/80 |
| 2024/0289369 | A1 * | 8/2024 | White | G06F 16/35 |
| 2024/0289588 | A1 * | 8/2024 | White | G06N 3/045 |
| 2024/0289696 | A1 * | 8/2024 | White | G06N 5/01 |
| 2025/0373863 | A1 | 12/2025 | Pang | |
| 2026/0032283 | A1 | 1/2026 | Pang | |

FOREIGN PATENT DOCUMENTS

| | | | | |
|---|---|---|---|---|
| CN | 118608782 | A * | 9/2024 | G06V 20/70 |
| WO | WO-2024178542 | A1 * | 9/2024 | H04N 19/132 |
| WO | 2025014553 | | 1/2025 | |
| WO | 2026024734 | A1 | 1/2026 | |

OTHER PUBLICATIONS

Xu, Yiling Translation of WO 2024178542 A1 Feb. 27, 2023 (Year: 2023).*

Hu, Mao-bang Translation of CN 113065810 A Dec. 31, 2019 (Year: 2019).*

Choy, C. et al., "4D Spatio-Temporal ConvNets: Minkowski Convolutional Neural Networks." In Proceedings of the IEEE/CVF conference on computer vision and pattern recognition, pp. 3075-3084. 2019 (10 pages).

Yang, R. et al., "Learning for video compression with recurrent auto-encoder and recurrent probability model." arXiv preprint arXiv:2006.13560. Dec. 2020 (17 pages).

Lin, J. et al., "M-LVC: Multiple frames prediction for learned video compression." In Proceedings of the IEEE/CVF conference on computer vision and pattern recognition, pp. 3546-3554. 2020 (9 pages).

Luo, W., et al., "Fast and furious: Real time end-to-end 3d detection, tracking and motion forecasting with a single convolutional net" In Proceedings of the IEEE conference on Computer Vision and Pattern Recognition, pp. 3569-3577. 2018 (9 pages).

Zhang, Y. et al., "SDP-Net: Scene flow based real-time object detection and prediction from sequential 3D point clouds." In Proceedings of the Asian Conference on Computer Vision. 2020 (17 pages).

Szegedy, C. et al., "Inception-v4, inception-resnet and the impact of residual connections on learning." In Proceedings of the AAAI conference on artificial intelligence, vol. 31, No. 1. pp. 4278-4284, 2017 (7 pages).

Mao, J. et al., "Voxel transformer for 3d object detection." In Proceedings of the IEEE/CVF international conference on computer vision, pp. 3164-3173. 2021 (10 pages).

Ahn, J., et al., DDA-Net: Deep Distribution-Aware Network for Point Cloud Compression, 2023 IEEE International Symposium on Circuits and Systems (ISCAS) 2023 (5 pages).

International Search Report and Written Opinion of the International Searching Authority for PCT/US2025/041342 mailed Nov. 25, 2025 (16 pages).

Xia, S. et al., "Learning dynamic point cloud compression via hierarchical inter-frame block matching." In Proceedings of the 31st ACM International Conference on Multimedia, pp. 7993-8003. 2023 (11 pages).

Xu, Y. et al., "[AI-3DGC] D-DPCC Test Results on 10 bit Owlii", International Organization for Standardization, ISO/IEC JTC 1/SC 29/WG 7, m60267, Online Jul. 2022 ( 7 pages).

* cited by examiner

DYNAMIC PCC WITH MULTIPLE REFERENCE FRAMES

INCORPORATION BY REFERENCE

The present application incorporates by reference in their entirety the following applications: U.S. Non-Provisional patent application Ser. No. 18/784,466, entitled "AN END-TO-END LEARNING-BASED DYNAMIC POINT CLOUD CODING FRAMEWORK" and filed Jul. 25, 2024 ("466 application"); and U.S. Non-Provisional patent application Ser. No. 18/679,144, entitled "AN END-TO-END LEARNING-BASED POINT CLOUD CODING FRAMEWORK" and filed May 30, 2024 ("144 application").

BACKGROUND

The present application is related to the field of point cloud compression and processing.

SUMMARY

A first example method in accordance with some embodiments may include: obtaining one or more motion bitstreams; decoding one or more motion features corresponding to the one or more motion bitstreams; obtaining one or more reference features corresponding to the one or more motion features; generating, via a set of neural network layers, one or more predicted features corresponding to the one or more motion features and the one or more reference features; merging, via another set of neural network layers, the one or more predicted features into a merged feature; and reconstructing a point cloud based on the merged feature.

For some embodiments of the first example method, decoding the one or more motion features includes entropy decoding the one or more motion bitstreams to form, respectively, the one or more motion features.

For some embodiments of the first example method, generating the one or more predicted features includes: inputting the one or more motion features and the one or more reference features into a predictor generation process; and outputting, via the predictor generation process, the one or more predicted features.

For some embodiments of the first example method, merging the one or more predicted features into the merged feature includes: weighting the one or more predicted features; and adding the weighted one or more predicted features to generate the merged feature.

For some embodiments of the first example method, merging the one or more predicted features into the merged feature includes: concatenating the one or more predicted features; passing the concatenated predicted features through a first neural network to generate a set of embedded features; passing the embedded features through a feature enhancement process to generate a set of enhanced features; and passing the set of enhanced features through a second neural network to generate the merged feature.

Some embodiments of the first example method may further include performing a pruning process on the set of enhanced features.

For some embodiments of the first example method, reconstructing the point cloud based on the merged feature includes passing the merged feature as condition for a conditional decoder to generate the reconstructed point cloud.

Some embodiments of the first example method may further include performing feature warping on at least one of the one or more reference features.

A first example apparatus in accordance with some embodiments may include: a processor; and a memory storing instructions operative, when executed by the processor, to cause the apparatus to: obtain one or more motion bitstreams; decode one or more motion features corresponding to the one or more motion bitstreams; obtain one or more reference features corresponding to the one or more motion features; generate, via a set of neural network layers, one or more predicted features corresponding to the one or more motion features and the one or more reference features; merge, via another set of neural network layers, the one or more predicted features into a merged feature; and reconstruct a point cloud based on the merged feature.

A second example method in accordance with some embodiments may include: obtaining one or more reference features; obtaining a current feature; estimating one or more motion features from the one or more reference features, each paired with the current feature; and packing the one or more motion features into one or more motion bitstreams.

Some embodiments of the second example method may further include: generating, via a set of neural network layers, one or more predicted features corresponding to the one or more motion features and the one of more reference features; and merging, via another set of neural network layers, the one or more predicted features into a merged feature.

For some embodiments of the second example method, generating the one or more predicted features includes: inputting the one or more motion features and the one or more reference features into a predictor generation process; and outputting, via the predictor generation process, the one or more predicted features.

For some embodiments of the second example method, merging the one or more predicted features into the merged feature includes: weighting the one or more predicted features; and adding the weighted one or more predicted features to generate the merged feature.

For some embodiments of the second example method, merging the one or more predicted features into the merged feature includes: concatenating the one or more predicted features; passing the concatenated predicted features through a first neural network to generate a set of embedded features; passing the embedded features through a feature enhancement process to generate a set of enhanced features; and passing the set of enhanced features through a second neural network to generate the merged feature.

Some embodiments of the second example method may further include performing a pruning process on the set of enhanced features.

Some embodiments of the second example method may further include conditionally encoding a current point cloud frame using the merged feature as a condition.

For some embodiments of the second example method, estimating the one or more motion features from the one or more reference features includes: inputting the current feature and a respective feature of the one or more reference features through a corresponding one or more motion estimation processes; and outputting the one or more motion features by the corresponding one or more motion estimation processes.

For some embodiments of the second example method, obtaining the one or more reference features includes merging two or more of the reference features.

Some embodiments of the second example method may further include performing feature warping on at least one of the one or more reference features.

For some embodiments of the second example method, performing feature warping includes: estimating one or more warped motion features from the one or more reference features; and generating the one or more warped reference features corresponding to the one or more warped motion features.

BRIEF DESCRIPTION OF THE DRAWINGS

The following detailed description will be better understood when read in conjunction with the appended drawings, in which there are shown examples of one or more of the multiple embodiments of the present disclosure. It should be understood, however, that the embodiments described herein are not limited to the precise arrangements and instrumentalities shown in the drawings. In the drawings.

Figure 1A:
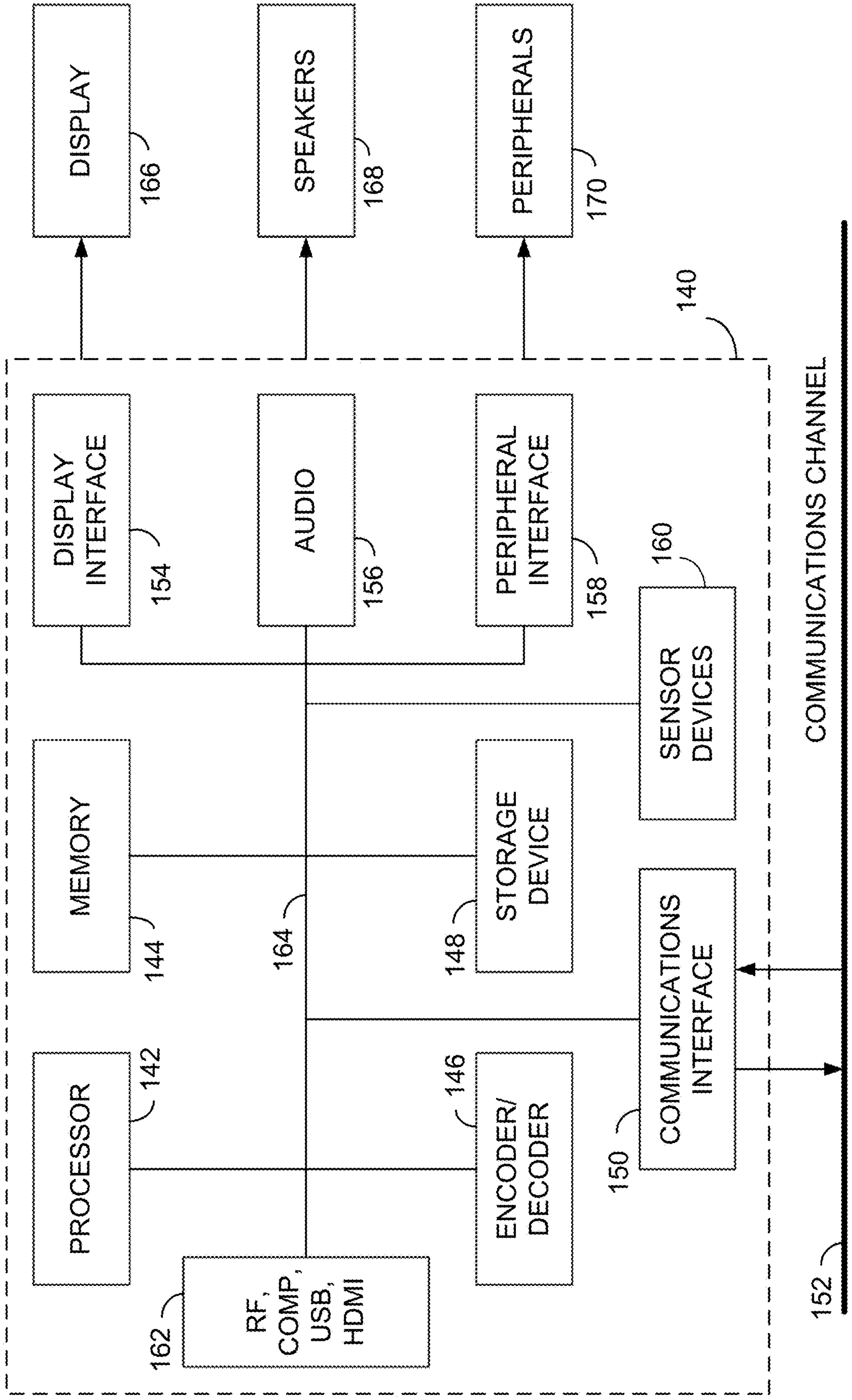
FIG. 1A is a system diagram illustrating an example set of interfaces for a system according to some embodiments.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . ." For brevity and clarity of presentation, this implied leading clause is not repeated ad nauseum in the detailed description.

DETAILED DESCRIPTION

In describing the various embodiments of the present disclosure, certain terminology is used herein for convenience only and should not be considered as limiting such embodiments. In the drawings, the same reference numerals are employed for designating the same elements throughout the several figures and the present description.

FIG. 1A is a system diagram illustrating an example set of interfaces for a system according to some embodiments. An extended reality display device, together with its control electronics, may be implemented using a system such as the system of FIG. 1A. System 140 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 140, singly or in combination, can be embodied in a single integrated circuit (IC), multiple ICs, and/or discrete components. For example, in at least one embodiment, the processing and encoder/decoder elements of system 140 are distributed across multiple ICs and/or discrete components. In various embodiments, the system 140 is communicatively coupled to one or more other systems, or other electronic devices, via, for example, a communications bus or through dedicated input and/or output ports. In various embodiments, the system 140 is configured to implement one or more of the aspects described in this document.

The system 140 includes at least one processor 142 configured to execute instructions loaded therein for implementing, for example, the various aspects described in this document. Processor 142 may include embedded memory, input output interface, and various other circuitries as known in the art. The system 140 includes at least one memory 144 (e.g., a volatile memory device, and/or a non-volatile memory device). System 140 may include a storage device 148, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 148 can include an internal storage device, an attached storage device (including detachable and non-detachable storage devices), and/or a network accessible storage device, as non-limiting examples.

System 140 includes an encoder/decoder module 146 configured, for example, to process data to provide an encoded video or decoded video, and the encoder/decoder module 146 can include its own processor and memory. The encoder/decoder module 146 represents module(s) that can be included in a device to perform the encoding and/or decoding functions. As is known, a device can include one or both of the encoding and decoding modules. Additionally, encoder/decoder module 146 can be implemented as a separate element of system 140 or can be incorporated within processor 142 as a combination of hardware and software as known to those skilled in the art.

Program code to be loaded onto processor 142 or encoder/decoder 146 to perform the various aspects described in this document can be stored in storage device 148 and subsequently loaded onto memory 144 for execution by processor 142. In accordance with various embodiments, one or more of processor 142, memory 144, storage device 148, and encoder/decoder module 146 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 142 and/or the encoder/decoder module 146 is used to store instructions and to provide working memory for processing that is needed during encoding or decoding. In other embodiments, however, a memory external to the processing device (for example, the processing device can be either the processor 142 or the encoder/decoder module 142) is used for one or more of these functions. The external memory can be the memory 144 and/or the storage device 148, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 140 can be provided through various input devices as indicated in block 162. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 1A, include composite video.

In various embodiments, the input devices of block 162 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 140 to other electronic devices across USB and/or HDMI connections. It is to be understood that various aspects of input processing, for example, Reed-Solomon error correction, can be implemented, for example, within a separate input processing IC or within processor 142 as necessary. Similarly, aspects of USB or HDMI interface processing can be implemented within separate interface ICs or within processor 142 as necessary. The demodulated, error corrected, and demultiplexed stream is provided to various processing elements, including, for example, processor 142, and encoder/decoder 146 operating in combination with the memory and storage elements to process the datastream as necessary for presentation on an output device.

Various elements of system 140 can be provided within an integrated housing, Within the integrated housing, the various elements can be interconnected and transmit data therebetween using suitable connection arrangement 164, for example, an internal bus as known in the art, including the Inter-IC (I2C) bus, wiring, and printed circuit boards.

The system 140 includes communication interface 150 that enables communication with other devices via communication channel 152. The communication interface 150 can include, but is not limited to, a transceiver configured to transmit and to receive data over communication channel 152. The communication interface 150 can include, but is not limited to, a modem or network card and the communication channel 152 can be implemented, for example, within a wired and/or a wireless medium.

Data is streamed, or otherwise provided, to the system 140, in various embodiments, using a wireless network such as a Wi-Fi network, for example IEEE 802.11 (IEEE refers to the Institute of Electrical and Electronics Engineers). The Wi-Fi signal of these embodiments is received over the communications channel 152 and the communications interface 150 which are adapted for Wi-Fi communications. The communications channel 152 of these embodiments is typically connected to an access point or router that provides access to external networks including the Internet for allowing streaming applications and other over-the-top communications. Other embodiments provide streamed data to the system 140 using a set-top box that delivers the data over the HDMI connection of the input block 162. Still other embodiments provide streamed data to the system 140 using the RF connection of the input block 162. As indicated above, various embodiments provide data in a non-streaming manner. Additionally, various embodiments use wireless networks other than Wi-Fi, for example a cellular network or a Bluetooth network.

The system 140 can provide an output signal to various output devices, including a display 166, speakers 168, and other peripheral devices 170. The display 166 of various embodiments includes one or more of, for example, a touchscreen display, an organic light-emitting diode (OLED) display, a curved display, and/or a foldable display. The display 166 can be for a television, a tablet, a laptop, a cell phone (mobile phone), or other device. The display 166 can also be integrated with other components (for example, as in a smart phone), or separate (for example, an external monitor for a laptop). The other peripheral devices 170 include, in various examples of embodiments, one or more of a stand-alone digital video disc (or digital versatile disc) (DVR, for both terms), a disk player, a stereo system, and/or a lighting system. Various embodiments use one or more peripheral devices 170 that provide a function based on the output of the system 140. For example, a disk player performs the function of playing the output of the system 140.

In various embodiments, control signals are communicated between the system 140 and the display 166, speakers 168, or other peripheral devices 170 using signaling such as AV.Link, Consumer Electronics Control (CEC), or other communications protocols that enable device-to-device control with or without user intervention. The output devices can be communicatively coupled to system 140 via dedicated connections through respective interfaces 154, 156, and 158. Alternatively, the output devices can be connected to system 140 using the communications channel 152 via the communications interface 150. The display 166 and speakers 168 can be integrated in a single unit with the other components of system 140 in an electronic device such as, for example, a television. In various embodiments, the display interface 154 includes a display driver, such as, for example, a timing controller (T Con) chip.

The display 166 and speaker 168 can alternatively be separate from one or more of the other components, for example, if the RF portion of input 162 is part of a separate set-top box. In various embodiments in which the display 166 and speakers 168 are external components, the output signal can be provided via dedicated output connections, including, for example, HDMI ports, USB ports, or COMP outputs.

The system 140 may include one or more sensor devices 160. Examples of sensor devices that may be used include one or more GPS sensors, gyroscopic sensors, accelerometers, light sensors, cameras, depth cameras, microphones, and/or magnetometers. Such sensors may be used to determine information such as user's position and orientation. Where the system 140 is used as the control module for an extended reality display (such as control modules), the user's position and orientation may be used in determining how to render image data such that the user perceives the correct portion of a virtual object or virtual scene from the correct point of view. In the case of head-mounted display devices, the position and orientation of the device itself may be used to determine the position and orientation of the user for the purpose of rendering virtual content. In the case of other display devices, such as a phone, a tablet, a computer monitor, or a television, other inputs may be used to determine the position and orientation of the user for the purpose of rendering content. For example, a user may select and/or adjust a desired viewpoint and/or viewing direction with the use of a touch screen, keypad or keyboard, trackball, joystick, or other input. Where the display device has sensors such as accelerometers and/or gyroscopes, the viewpoint and orientation used for the purpose of rendering content may be selected and/or adjusted based on motion of the display device.

The embodiments can be carried out by computer software implemented by the processor 142 or by hardware, or by a combination of hardware and software. As a non-limiting example, the embodiments can be implemented by one or more integrated circuits. The memory 144 can be of any type appropriate to the technical environment and can be implemented using any appropriate data storage technology, such as optical memory devices, magnetic memory devices, semiconductor-based memory devices, fixed memory, and removable memory, as non-limiting examples. The processor 142 can be of any type appropriate to the technical environment, and can encompass one or more of microprocessors, general purpose computers, special purpose computers, and processors based on a multi-core architecture, as non-limiting examples.

Scene Description Framework for XR

In some embodiments, examples disclosed herein may be used in the domain of rendering of extended reality scene description and extended reality rendering. For some embodiments, for example, the present application may be applied in the context of the formatting and the playing of extended reality applications when rendered on end-user devices such as mobile devices or Head-Mounted Displays (HMD). For some example embodiments, gITF material may be rendered in a 3D environment that is rendered through a 2D screen. The examples presented herein in accordance with some embodiments are not limited to XR applications.

In XR applications, a scene description is used to combine explicit and easy-to-parse description of a scene structure and some binary representations of media content.

In time-based media streaming, the scene description itself can be time-evolving to provide the relevant virtual content for each sequence of a media stream. For instance, for advertising purpose, a virtual bottle can be displayed during a video sequence where people are drinking.

This kind of behavior can be achieved by relying on the framework defined in the Scene Description for MPEG media document, Information technology-Coded representation of immersive media—Part 14: Scene Description for MPEG media, ISO/IEC DIS 23090-14:2021 (E). A scene update mechanism based on the JSON Patch protocol as defined in IETF RFC 6902 may be used to synchronize virtual content to MPEG media streams.

Figure 1B:
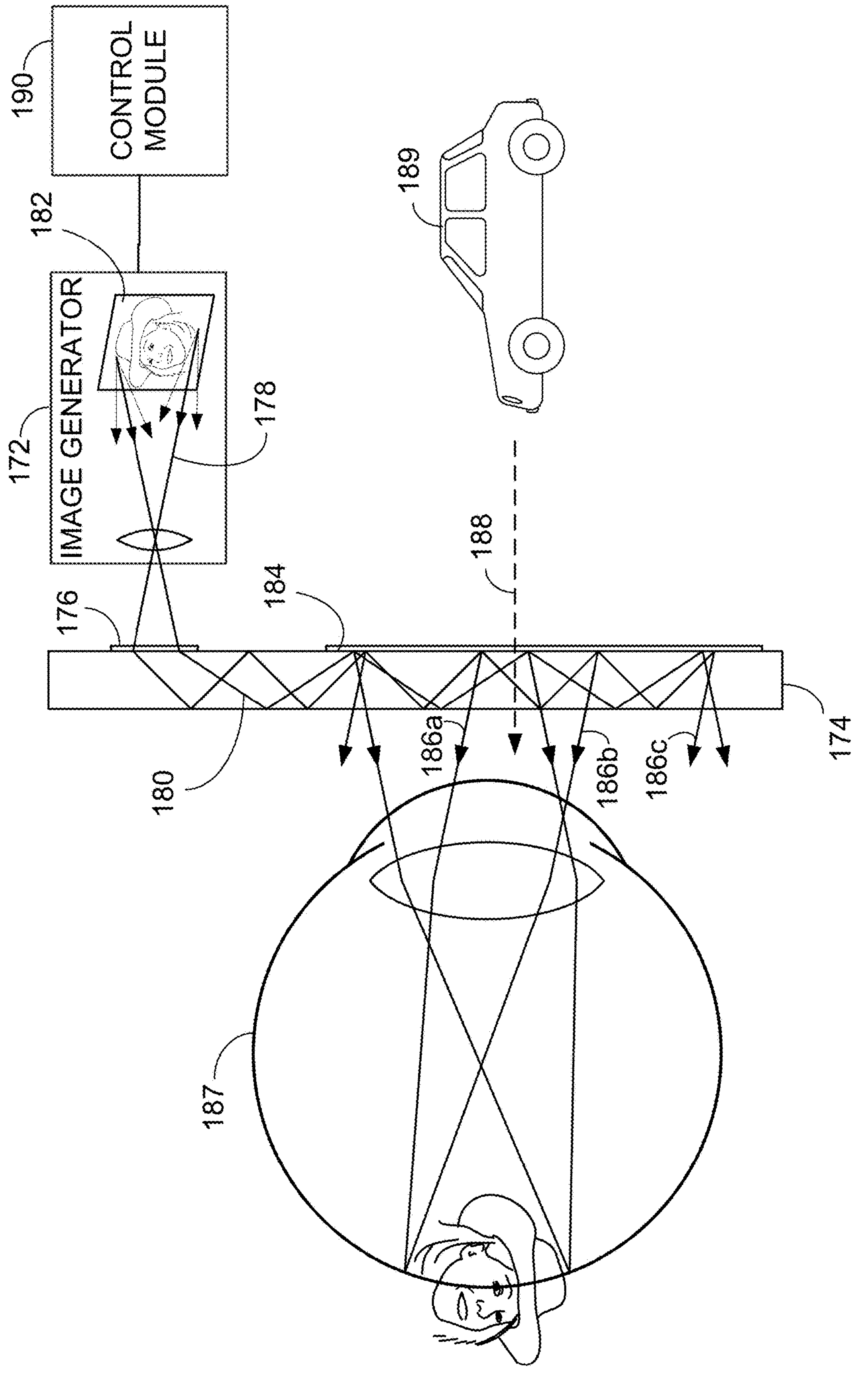
FIG. 1B is a schematic side view illustrating an example waveguide display that may be used with extended reality (XR) applications according to some embodiments.

FIG. 1B is a schematic side view illustrating an example waveguide display that may be used with extended reality (XR) applications according to some embodiments. An image is projected by an image generator 172. The image generator 172 may use one or more of various techniques for projecting an image. For example, the image generator 172 may be a laser beam scanning (LBS) projector, a liquid crystal display (LCD), a light-emitting diode (LED) display (including an organic LED (OLED) or micro LED (μLED)

display), a digital light processor (DLP), a liquid crystal on silicon (LCoS) display, or other type of image generator or light engine.

Light representing an image 182 generated by the image generator 172 is coupled into a waveguide 174 by a diffractive in-coupler 176. The in-coupler 176 diffracts the light representing the image 182 into one or more diffractive orders. For example, light ray 178, which is one of the light rays representing a portion of the bottom of the image, is diffracted by the in-coupler 176, and one of the diffracted orders 180 (e.g. the second order) is at an angle that is capable of being propagated through the waveguide 174 by total internal reflection. The image generator 172 displays images as directed by a control module 190, which operates to render image data, video data, point cloud data, or other displayable data.

At least a portion of the light 180 that has been coupled into the waveguide 174 by the diffractive in-coupler 176 is coupled out of the waveguide by a diffractive out-coupler 184. At least some of the light coupled out of the waveguide 174 replicates the incident angle of light coupled into the waveguide. For example, in the illustration, out-coupled light rays 186*a*, 186*b*, and 186*c* replicate the angle of the in-coupled light ray 178. Because light exiting the out-coupler replicates the directions of light that entered the in-coupler, the waveguide substantially replicates the original image 182. A user's eye 187 can focus on the replicated image.

In the example of FIG. 1B, the out-coupler 184 out-couples only a portion of the light with each reflection allowing a single input beam (such as beam 178) to generate multiple parallel output beams (such as beams 186*a*, 186*b*, and 186*c*). In this way, at least some of the light originating from each portion of the image is likely to reach the user's eye even if the eye is not perfectly aligned with the center of the out-coupler. For example, if the eye 187 were to move downward, beam 186*c* may enter the eye even if beams 186*a* and 186*b* do not, so the user can still perceive the bottom of the image 182 despite the shift in position. The out-coupler 184 thus operates in part as an exit pupil expander in the vertical direction. The waveguide may also include one or more additional exit pupil expanders (not shown in FIG. 3A) to expand the exit pupil in the horizontal direction.

In some embodiments, the waveguide 174 is at least partly transparent with respect to light originating outside the waveguide display. For example, at least some of the light 188 from real-world objects (such as object 189) traverses the waveguide 174, allowing the user to see the real-world objects while using the waveguide display. As light 188 from real-world objects also goes through the diffraction grating 184, there will be multiple diffraction orders and hence multiple images. To minimize the visibility of multiple images, it is desirable for the diffraction order zero (no deviation by 184) to have a great diffraction efficiency for light 188 and order zero, while higher diffraction orders are lower in energy. Thus, in addition to expanding and out-coupling the virtual image, the out-coupler 184 is preferably configured to let through the zero order of the real image. In such embodiments, images displayed by the waveguide display may appear to be superimposed on the real world.

Figure 1C:
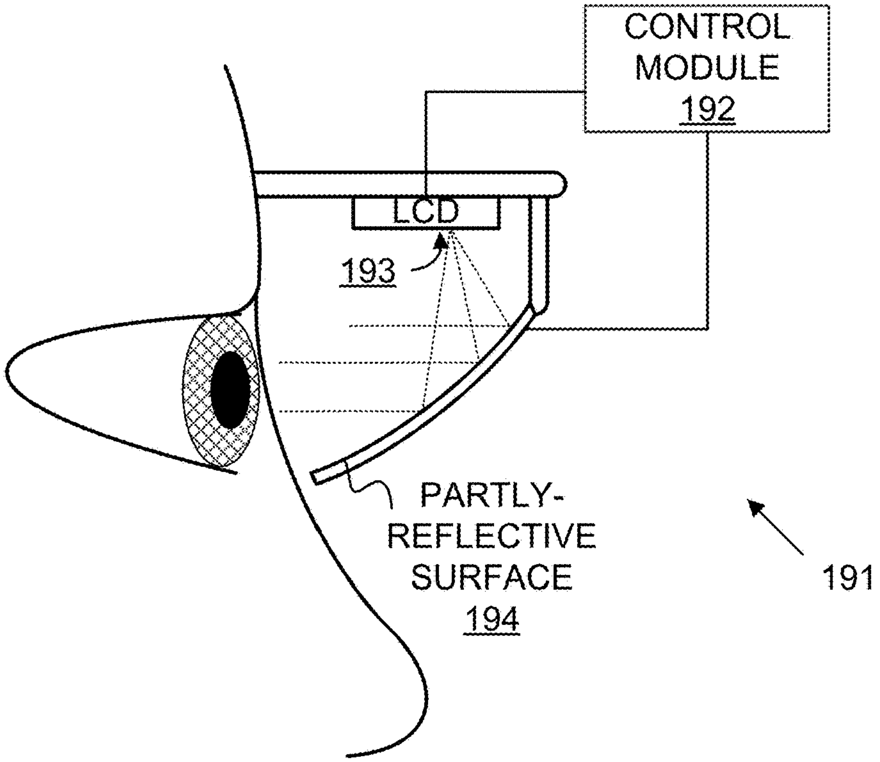
FIG. 1C is a schematic side view illustrating an example alternative display type that may be used with extended reality applications according to some embodiments.

FIG. 1C is a schematic side view illustrating an example alternative display type that may be used with extended reality applications according to some embodiments. In an XR head-mounted display device 191, a control module 192 controls a display 193, which may be an LCD, to display an image. The head-mounted display includes a partly-reflective surface 194 that reflects (and in some embodiments, both reflects and focuses) the image displayed on the LCD to make the image visible to the user. The partly-reflective surface 194 also allows the passage of at least some exterior light, permitting the user to see their surroundings.

Figure 1D:
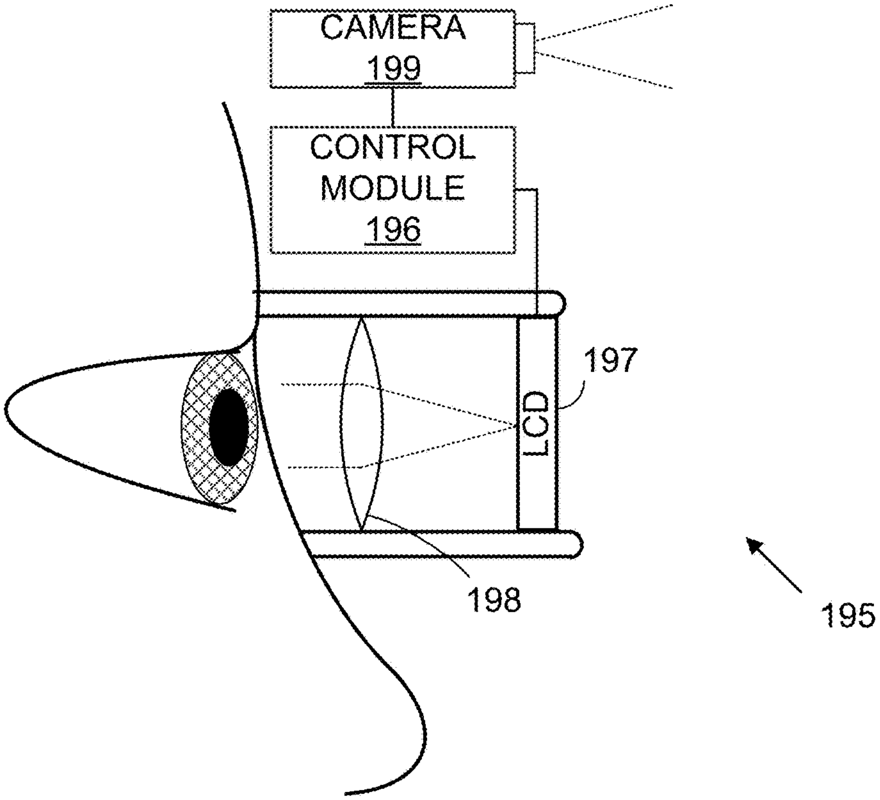
FIG. 1D is a schematic side view illustrating an example alternative display type that may be used with extended reality applications according to some embodiments.

FIG. 1D is a schematic side view illustrating an example alternative display type that may be used with extended reality applications according to some embodiments. In an XR head-mounted display device 195, a control module 196 controls a display 197, which may be an LCD, to display an image. The image is focused by one or more lenses of display optics 198 to make the image visible to the user. In the example of FIG. 1D, exterior light does not reach the user's eyes directly. However, in some such embodiments, an exterior camera 199 may be used to capture images of the exterior environment and display such images on the display 197 together with any virtual content that may also be displayed.

The embodiments described herein are not limited to any particular type or structure of XR display device.

A User Equipment (UE) may correspond to any extended Reality (XR) device/node which may come in variety of form factors. Typical UE (e.g., XR UE) may include, but not limited to the following: Head Mounted Displays (HMD), optical see-through glasses and video see-through HMDs for Augmented Reality (AR) and Mixed Reality (MR), mobile devices with positional tracking and camera, wearables etc. In addition to the above, several different types of XR UE may be envisioned based on XR device functions for e.g., as display, camera, sensors, sensor processing, wireless connectivity, XR/Media processing, and power supply, to be provided by one or more devices, wearables, actuators, controllers and/or accessories. One or more device/nodes/UEs may be grouped into a collaborative XR group for supporting any of XR applications/experience/services.

This application belongs to the field of point cloud compression and processing. This field aims to develop tools for compression, analysis, interpolation, representation and understanding of input signals such as point cloud.

Point Cloud Data Format

Point cloud is a universal data format across several business domains from autonomous driving, robotics, AR/VR, civil engineering, computer graphics, to the animation/movie industry. 3D LiDAR sensors have been deployed in self-driving cars, and affordable LiDAR sensors are released from Velodyne Velabit, Apple iPad Pro 2020 and Intel RealSense LiDAR camera L515. With advances in sensing technologies, 3D point cloud data becomes more practical than ever.

Point cloud data is also believed to consume a large portion of network traffic, e.g., among connected cars over 5G network, and immersive communications (VR/AR). Efficient representation formats may be necessary for point cloud understanding and communication. In particular, raw point cloud data may be organized and processed for the purposes of world modeling & sensing. Compression of raw point clouds may be used when storage and transmission of the data are used in the related scenarios.

Furthermore, point clouds may represent a sequential scan of the same scene, which contains multiple moving objects. They are called dynamic point clouds as compared to static point clouds captured from a static scene or static objects. Dynamic point clouds are typically organized into frames, with different frames being captured at different times. Dynamic point clouds may require the processing and compression to be handled in real-time or with low delay.

Point Cloud Data Use Cases

The automotive industry and autonomous car are domains in which point clouds may be used. Autonomous cars are able to "probe" their environment to make good driving decisions based on the reality of their immediate surroundings. Typical sensors like LiDARs produce (dynamic) point clouds that are used by the perception engine. These point clouds are not intended to be viewed by human eyes, and they are typically sparse, not necessarily colored, and dynamic with a high frequency of capture. They may have other attributes like the reflectance ratio provided by the LiDAR because this attribute may be indicative of the material of the sensed object, and this attribute may be used in making a decision.

Virtual Reality (VR) and immersive worlds have become a hot topic and are foreseen by many as the future of 2D flat video. The viewer is immersed in an environment all around the viewer as opposed to standard TV in which the viewer may look only at the virtual world in front of the viewer. There are several gradations in the immersivity depending on the freedom of the viewer in the environment. Point clouds are a good format candidate to distribute VR worlds. They may be static or dynamic and are typically of average size, with, e.g., no more than millions of points at a time.

Point clouds also may be used for various purposes, such as cultural heritage/buildings in which objects, like statues or buildings, are scanned in 3D to share the spatial configuration of the object without sending or visiting the statues or buildings. Also, point clouds offer a way to ensure preservation of the knowledge of the object in case the original object, for instance, is destroyed by an earthquake. Such point clouds are typically static, colored, and huge.

Another use case is in topography and cartography in which, when using 3D representations, maps are not limited to the plane and may include the relief. Google Maps is now a good example of 3D maps but is understood to use meshes instead of point clouds. Nevertheless, point clouds may be a suitable data format for 3D maps, and such point clouds are typically static, colored, and huge.

World modeling and sensing via point clouds may be a technology that allows machines to gain knowledge about the 3D world around them, which may be used by the applications discussed above.

General Challenges 3D point cloud data include discrete samples of the surfaces of objects or scenes. A huge number of points may be used to fully represent the real world with point samples. For instance, a typical VR immersive scene may contain millions of points, while point clouds typically contain hundreds of millions of points. Therefore, the processing of such large-scale point clouds may be computationally expensive, especially for consumer devices, such as smartphones, tablets, and automotive navigation systems, that have limited computational power.

The first step for processing or inference on the point cloud is to have efficient storage methodologies. To store and process the input point cloud with affordable computational cost, the point cloud may be down-sampled first, in which the down-sampled point cloud summarizes the geometry of the input point cloud while having much fewer points. The down-sampled point cloud may be inputted into a machine task for further processing. However, further reduction in storage space may be achieved by converting the raw point cloud data (original or down-sampled) into a bitstream through entropy coding techniques for lossless compression.

In addition to lossless coding, many scenarios may use lossy coding for significantly improved compression ratios while maintaining the induced distortion under certain quality levels. To achieve a less lossy coding, an efficient point feature extractor may be used to improve the accuracy of the reconstruction within the given resource budget.

An additional challenge is efficiently interpreting the sparse nature of the 3D point clouds compared to the regularly arranged 2D pixel samples for the image. To handle this issue, a sparse convolution method may be used. See Choy, C., Gwak, J., and Savarese, S., *4D Spatio-Temporal ConvNets: Minkowski Convolutional Neural Networks*, In Proceedings of the IEEE/CVF Conference on Computer Vision and Pattern Recognition (CVPR) 3075-3084 (2019). Based on these so-called sparse CNN, the learning-based point cloud compression (PCC) becomes an interesting topic in the computer vision and machine learning communities.

Motion Estimation for Point Cloud Compression

In general, a sequence of 3D point cloud does not have temporal correspondence between adjacent time frames. This lack of temporal correspondence makes the motion analysis and motion compensation processes more challenging compared to other 3D sequence representations, such as a mesh. For an efficient dynamic point cloud compression (PCC), typically either motion vector or motion feature is applied to analyze and synthesize the motion information. The vector-based approach may use a fine-grained control because each vector points towards a temporally corresponding point or block. On the other hand, feature-based approaches often aggregate features in a down-sampled block level, but carefully-designed set of neural network (NN) layers may be necessary to avoid loss of information during the feature aggregation, motion analysis, or motion compensation steps.

The predictive coding of a point cloud frame is understood to usually use one reference frame to help predicting the coding frame. This is due to the complexity of the learning-based architecture and because of the relatively lower interests in predicting fine detailed or large motions. However, with recent evolutions of both learning-based predictive coding methods and GPU hardware development, the importance of estimating precise motion and predicting closer point cloud to the original frame has increased. As such, this application discusses, for some embodiments, a feature-based predictive point cloud compression (PCC) framework with multiple reference frames in consideration.

In video compression, previous methods tackled multiple reference frames to improve the coding performance. A recurrent neural network (RNN) based video compression approach, the recurrent learned video compression (RLVC) discussed in Yang, R., et al., *Learning for Video Compression with Recurrent Auto-Encoder and Recurrent Probability Model,* 15:2 J. Selected Topics in Signal Proc. 388-401 (2021) is applied to recurrent networks for representing the inputs and reconstructing compressed outputs. Specifically, a recurrent auto encoder block, which includes a recurrent cell in both the encoder and decoder, generates a latent representation of the input and reconstructs a compressed output in a recurrent manner. However, the training may be challenging and computationally expensive.

Another method, the multiple frames prediction for learned video compression (M-LVC), is proposed in Lin, J., et al., *M-lvc: Multiple Frames Prediction for Learned Video Compression*, In Proceedings of the IEEE/CVF CVPR 3546-3554 (2020) and is understood to calculate motion vector (MV) fields and refine them through dedicated neural network architecture. The multiple reference frames help generate MV prediction. The prediction steps are processed in motion vector space, which may be costly in terms of computation and more suitable for the video compression domain than sparse point cloud compression.

In learning-based point cloud compression, the use of multiple reference frames is relatively newer. Some works analyzed multiple reference frames for the purpose of enhancing object detection for autonomous driving applications. The fast and furious (FaF) network discussed in Luo, W., Yang, B., and Urtasun, R., *Fast and Furious: Real Time End-to-End 3D Detection, Tracking, and Motion Forecasting with a Single Convolutional Net*, In IEEE/CVF Conference on Computer Vision and Pattern Recognition 3569-3577 (2018) ("Luo") is understood to take multiple frames as input and performs detection and tracking of objects from LiDAR sequence. Luo discusses a network designed to operate on a bird-eye-view (BEV) of a 3D world. The approach performs 3D convolutions across space and time to track the objects. However, this method is limited to LiDAR sequences.

On the other hand, the scene flow based real-time object and detection and prediction (SDP-Net) method discussed in Zhang, Y., et al., *Scene Flow Based Real-Time Object Detection and Prediction from Sequential 3D Point Clouds*, In Proceedings of the Asian Conference on Computer Vision (2020) is understood to propose a scene flow based multi-BEV frames alignment method for 3D object detection. These approaches for point cloud applications are designed for detection tasks, and the input point clouds are rather limited to sparse LiDAR, which may be simplified to a 2D BEV map.

For some embodiments, this application focuses on the learning-based point cloud compression tasks, while considering more general point cloud inputs. This application introduces a feature-based predictive coding method for a learning-based dynamic point cloud compression (DPCC) framework. For some embodiments, multiple reference frames are used to improve coding performance. Some embodiments implement a series of multiple feature-based motion estimations followed by corresponding motion compensations derived from multiple reference frames.

Dynamic PCC Encoder with Multiple Reference Frames

Figure 2:
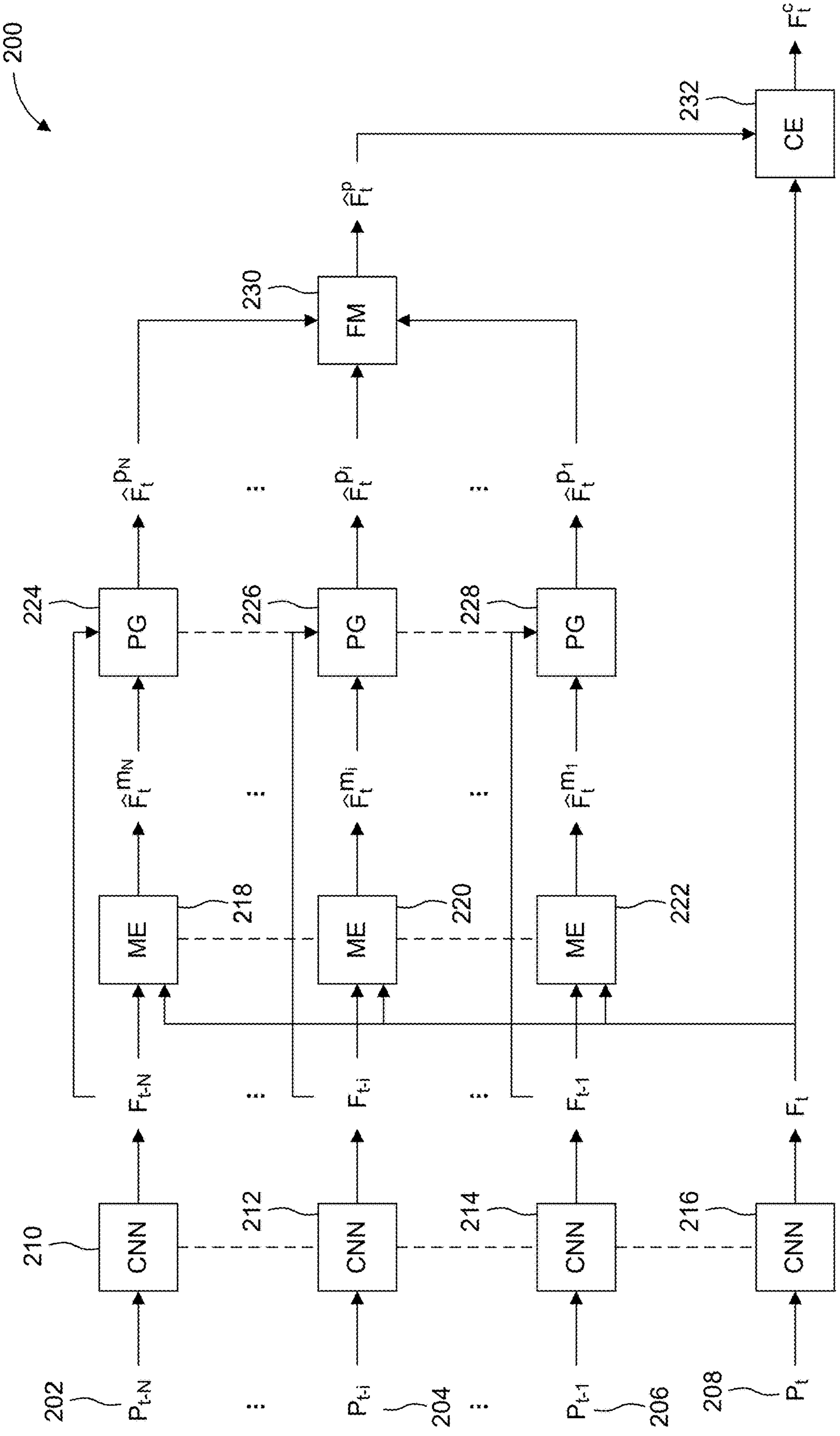
FIG. 2 is a process diagram illustrating an example DPCC encoder architecture with multiple reference frames according to some embodiments.

FIG. 2 is a process diagram illustrating an example DPCC encoder architecture with multiple reference frames according to some embodiments. FIG. 2 shows an example architecture 200 for a learning-based DPCC encoder.

The current point cloud frame $P_t$ (208) and N reference frames from $P_{t-1}$ to $P_{t-N}$(206, 204, 202) are processed through a series of CNN layers 210, 212, 214, 216, including down-samplings, which output a corresponding current frame's ($P_t$) feature map $F_t$ and N reference frames' ($P_{t-1}, \ldots, P_{t-i}, \ldots, P_{t-N}$) feature maps $F_{t-1}, \ldots, F_{t-i}, \ldots, F_{t-N}$. As illustrated in FIG. 2, the CNN blocks 210, 212, 214, 216 are linked with a dashed line, which means that the network parameters of the CNN blocks may be either shared or not shared for each frame input. Each feature $F_{t-1}, \ldots, F_{t-i}, \ldots, F_{t-N}$ extracted from a reference frame may be paired with the feature $F_t$ that is extracted from the current frame, then are inputted into a motion estimation block, which is depicted as a set of ME blocks 218, 220, 222 in FIG. 2.

Figure 3:
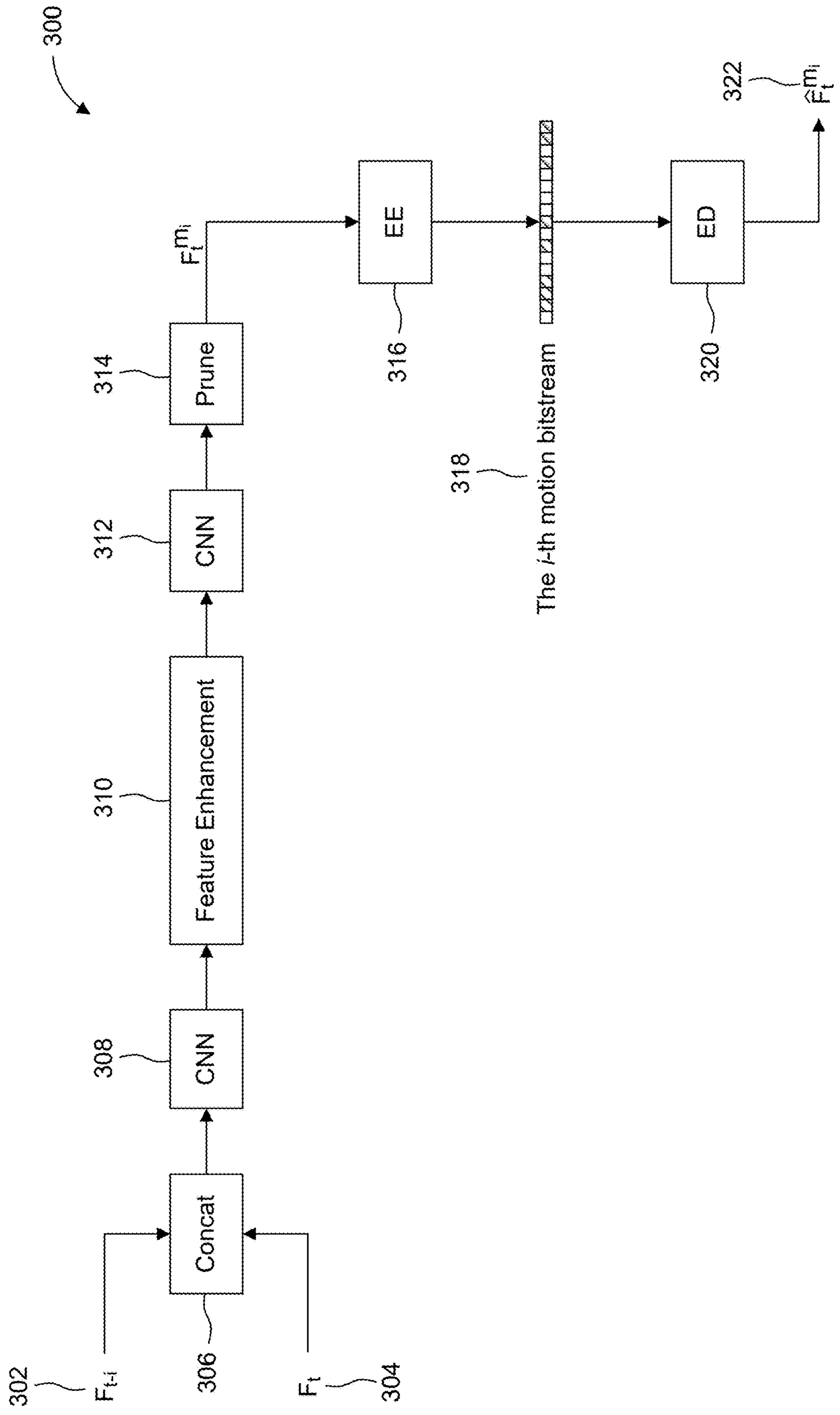
FIG. 3 is a process diagram illustrating an example feature-based motion estimation process according to some embodiments.

A detailed example of an ME block is described with regard to FIG. 3. Like the CNNs, the network parameters of the ME blocks linked with a dashed line also may be share or not shared for some embodiments. Each ME block output a motion feature $$\hat{F}_t^{m_i},$$

which means an extracted motion feature from the i-th reference frame at time t-i to the current frame at time t. For the example shown in FIG. 2, each motion feature in $$\hat{F}_t^{m_1}, \ldots, \hat{F}_t^{m_i}, \ldots, \hat{F}_t^{m_N}$$

is defined on a down-sampled current point cloud.

After obtaining multiple motion features from N reference frames $P_{t-1}, \ldots, P_{t-i}, \ldots, P_{t-N}$, the motion features $$\hat{F}_t^{m_1}, \ldots, \hat{F}_t^{m_i}, \ldots, \hat{F}_t^{m_N}$$

may be paired with their corresponding reference features $F_{t-1}, \ldots, F_{t-i}, \ldots, F_{t-N}$, respectively, which may be inputted into a predictor generation (PG) block 224, 226, 228. A PG block generates a predicted current feature $$F_t^{p_i}$$

from time t-i. Again, the PG blocks 224, 226, 228 are linked with a dashed line and may be either shared or not shared for some embodiments. A detailed example of this PG block is described with regard to FIG. 4.

Finally, the predicted features $$F_t^{p_1}, \ldots, F_t^{p_i}, \ldots, F_t^{p_N}$$

at time t may be combined and enhanced through a feature merging (FM) block 230. By considering that the N predicted features are defined on current space, a pre-determined weighting coefficient on each predicted feature $$F_t^{p_i}$$

may be learnt during training. For some embodiments, these weighting coefficients may be generated by a learnt NN layers. More details on this FM block will be described later.

After the predicted features are merged to a unique feature $$F_t^{p},$$

the feature is inputted into a conditional encoder (CE) block 232 along with the previously extracted current feature $F_t$, then outputs a coding feature $$F_t^{c}.$$

This coding feature will be encoded as a feature bitstream via entropy encoding process. This architecture is applicable to the unified PCC architecture for some embodiments. See the '466 application and the '144 application.

Motion Estimation

FIG. 3 is a process diagram illustrating an example feature-based motion estimation process according to some embodiments. As illustrated in the example architecture 300 of FIG. 3, a motion estimation (ME) block takes an i-th reference feature $F_{t-i}$ 302 and the current feature $F_t$ 304 as inputs. A concatenation block 306 concatenates features on the points where the features coexist in both frames. If a feature is defined in only one frame, the feature is concatenated with a zero feature. The concatenated feature is embedded through one or a series of CNN layers 308 and may be processed through a set of feature enhancement layers 310, such as IRN, voxel transformer, or DDA-Net, among others. The IRN is discussed in Szegedy, C., et al., *Inception-v4, Inception-ResNet and the Impact of Residual Connections on Learning,* 31:1 In Proceedings of the AAAI Conference on Artificial Intelligence (2017) ("Szegedy"). The voxel transformer is discussed in Mao, J., et al., *Voxel Transformer for 3D Object Detection*, In Proceedings of the IEEE/CVF International Conference on Computer Vision (ICCV) 10012-10022 (2021) ("Mao"). The DDA-Net is discussed in Ahn, J., et al., *DDA-Net: Deep Distribution-Aware Network for Point Cloud Compression*, In 2023 IEEE International Symposium on Circuits and Systems (ISCAS) 1-5 (2023) ("Ahn").

An additional set of CNN layers 312 may be followed for the purpose of embedding the enhanced feature. At this point, the feature vectors are defined for the union of $F_{t-i}$ and $F_t$ points. To ease the merging process, in some embodiments, a pruning block 314 may prune out the feature vectors that are not defined in $F_t$ and output an i-th motion feature $$F_t^{m_i}.$$

This non-quantized motion feature may be used for a feature warping process.

To align with the motion feature in the decoder, an i-th motion bitstream 318 is encoded then decoded through a motion entropy encoder (EE) 316 and entropy decoder (ED) 320, respectively. Then the decoded motion feature $$\hat{F}_t^{m_i}$$

322 is outputted for the next encoding stage. This design allows the motion features to be identical between the encoder and decoder for each reference frame. On the decoder side, decoding starts with the given motion bitstream 318.

Predictor Generation

Figure 4:
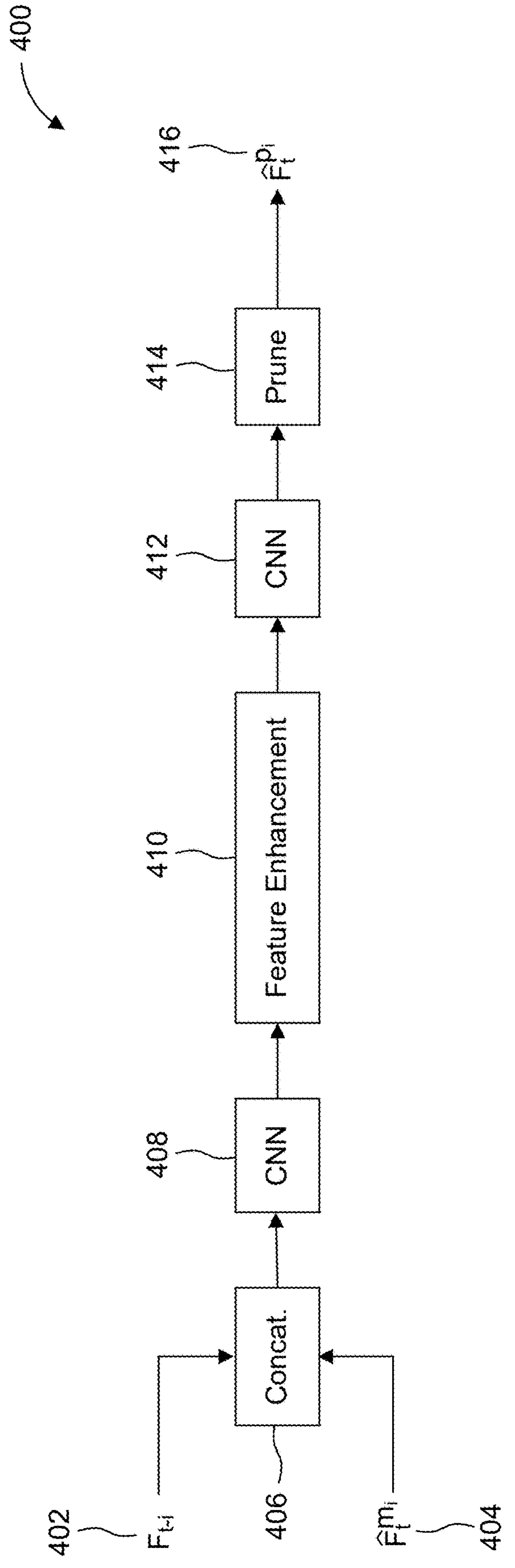
FIG. 4 is a process diagram illustrating an example predicted feature generation process according to some embodiments.

FIG. 4 is a process diagram illustrating an example predicted feature generation process according to some embodiments. After a motion feature $$\hat{F}_t^{m_i}$$

404 is outputted by an ME block, the motion feature 404 and the reference feature $F_{t-i}$ 402 are inputted into a predictor generation (PG) block to output a predicted current feature $$F_t^{p_i}$$

416 from a reference feature given at time t-i. As shown in the example architecture 400 of FIG. 4, the PG architecture is similar to the ME block. For some embodiments, a concatenation block 406 concatenates $F_{t-i}$ 402 and $$\hat{F}_t^{m_i}$$

404 in the same manner as the concentration block in FIG. 3, The same concatenation is possible because the motion feature vectors are defined on the current points at time t. The same feature embedded with CNN layers 408 and followed by feature enhancement 410, such as the architecture mentioned in Szegedy, Mao, or Ahn, may be implemented to improve the quality of predicting feature. Additional CNN layers 412 may be applied to embed the enhanced feature. The enhanced feature may be pruned 414 to define predicted features for the current points. This predictor generation step may predict the current feature at time t, by applying the estimated motion feature $$\hat{F}_t^{m_i}$$

for the given reference feature at time t-i. This process outputs a predicted feature $$F_t^{p_i}$$

416.

Feature Warping

Figure 5:
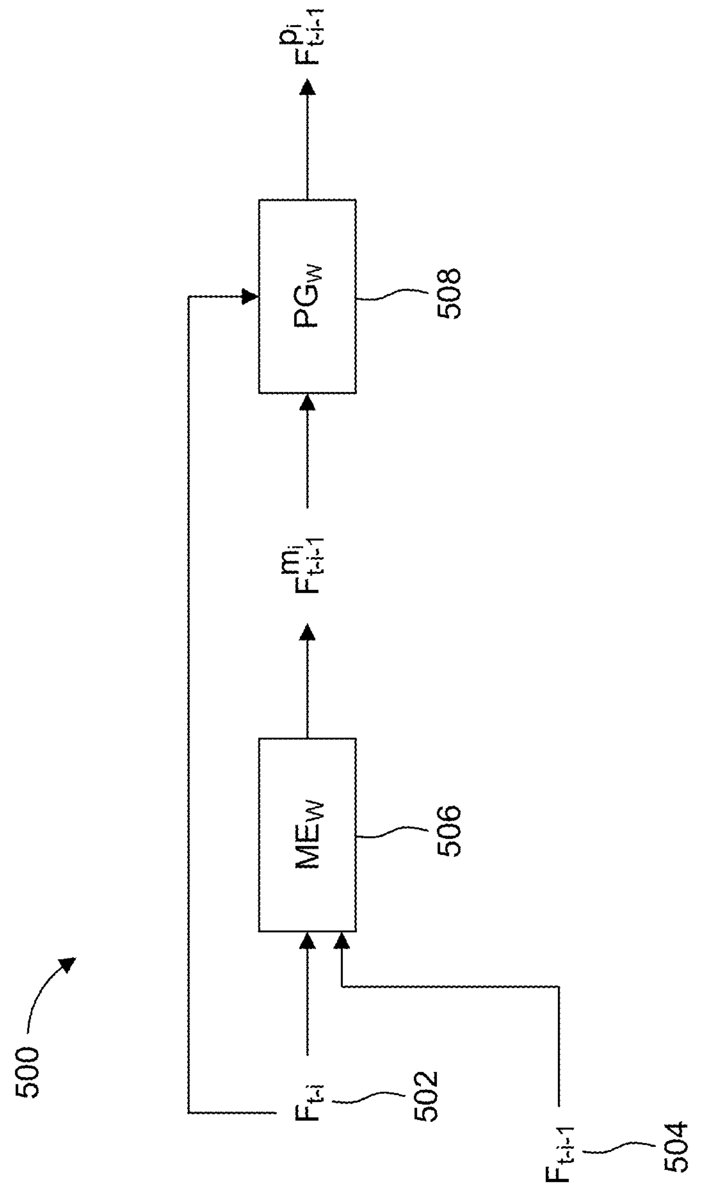
FIG. 5 is a process diagram illustrating an example feature warping process according to some embodiments.

FIG. 5 is a process diagram illustrating an example feature warping process according to some embodiments. Rather than directly predicting current feature from t-i frame, a feature warping block may be introduced to predict a feature frame by frame from a reference frame at time t-i to the current frame at time t. The process of feature warping (FW) is illustrated in the example architecture 500 of FIG. 5. A motion estimation for warping ($ME_w$) block 506 takes two reference features $F_{t-i-1}$ 504 and $F_{t-i}$ 502 as inputs. A non-quantized motion feature $$F_{t-i-1}^{m_i}$$

between the two frames is generated for points t-i−1. This motion feature and the reference feature $F_{t-i}$ are given to predictor generation for warping (PGw) block 508 to output a predicted feature $$F_{t-i-1}^{p_i}$$

of the frame at time t-i−1.

Figure 6:
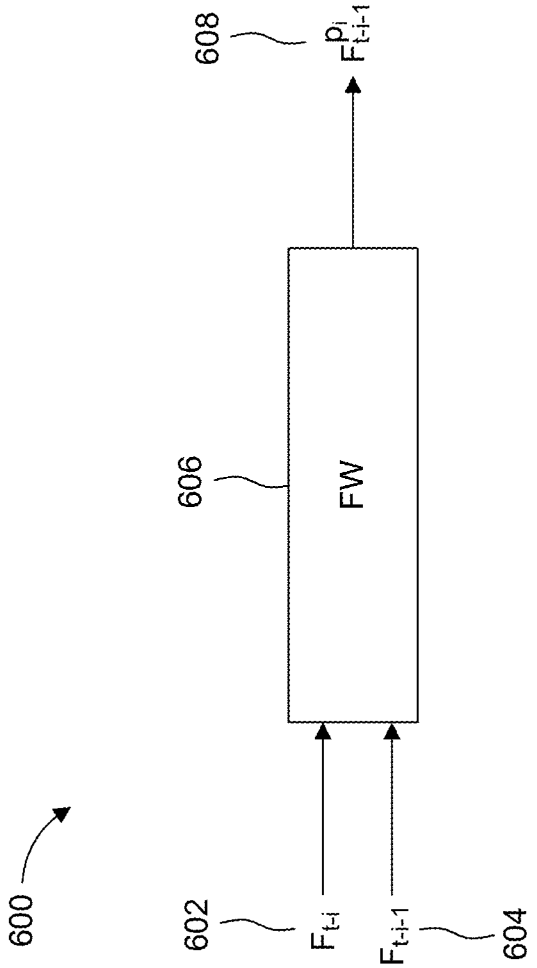
FIG. 6 is a process diagram illustrating an example feature warping block according to some embodiments.

FIG. 6 is a process diagram illustrating an example feature warping block according to some embodiments. FIG. 6 shows an example architecture 600 for an abstracted feature warping (FW) block 606 with $F_{t-i-1}$ 604 and $F_{t-i}$ 602 as inputs and $$F_{t-i-1}^{Pi}$$

608 as output.

Figure 7:
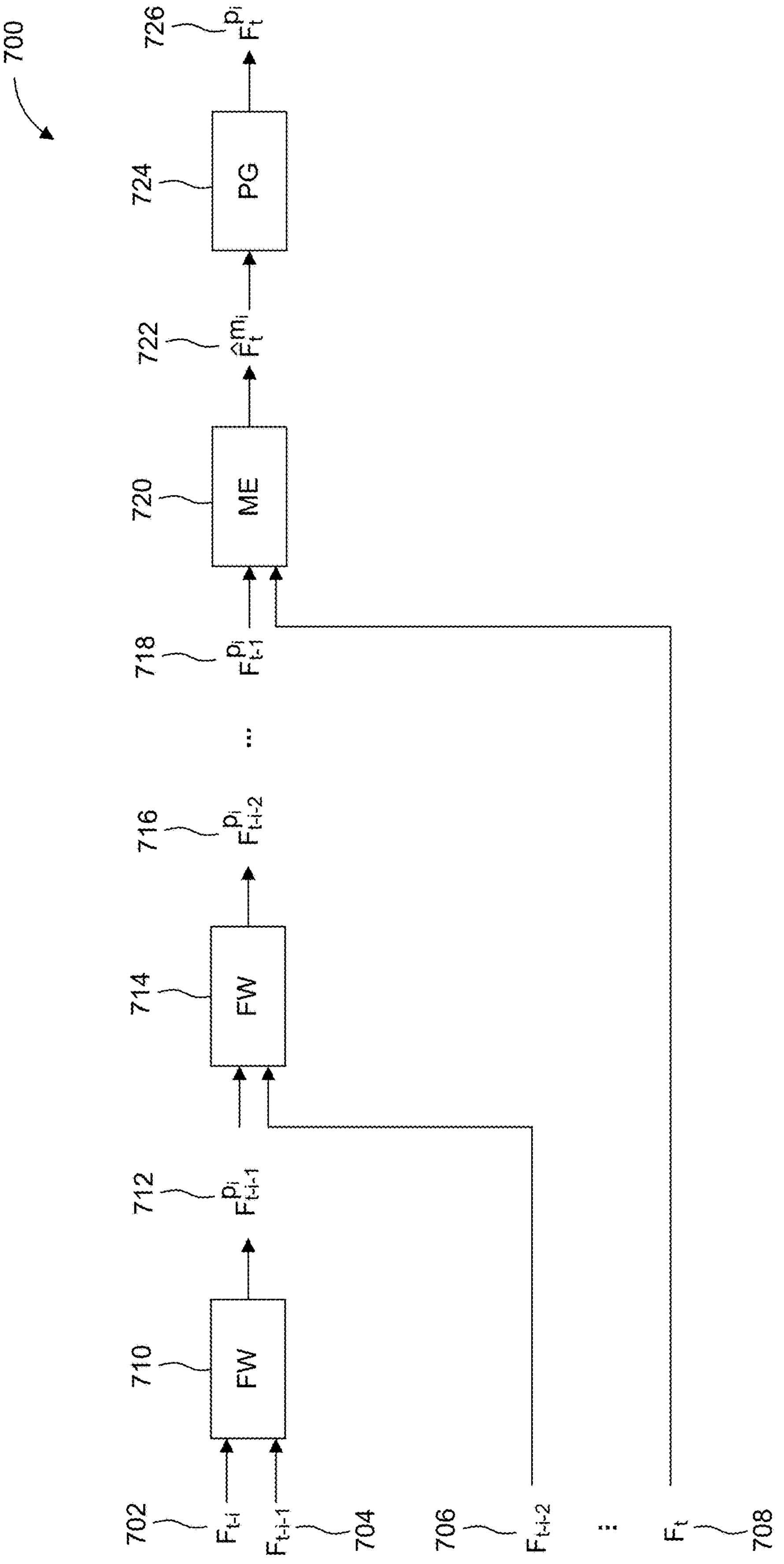
FIG. 7 is a process diagram illustrating an example series of feature warping blocks for encoding predicted current features according to some embodiments.

FIG. 7 is a process diagram illustrating an example series of feature warping blocks for encoding predicted current features according to some embodiments. By using a series of FW blocks 710, 714, another encoder may be created for some embodiments. A series of FW blocks 710, 714 from time t-i to time t generate a predicted feature at current frame, where the reference frame at time t−1 is warped from the reference frame at time t-i. As illustrated in the example architecture 700 of FIG. 7, the reference features $F_{t-i}$ 702 and $F_{t-i-1}$ 704 go through a feature warping block 710 to generate a predicted feature $$F_{t-i-1}^{Pi}$$

712. The next reference feature $F_{t-i-2}$ 706, along with the predicted feature $$F_{t-i-1}^{Pi}$$

712 go through another FW block 714 to output a new predicted feature $$F_{t-i-2}^{Pi}$$

716 at time t-i−2. Time series of FW blocks continue until the series reaches a predicted feature $$F_{t-1}^{Pi}$$

718 defined at time t−1. From this predicted feature $$F_{t-1}^{Pi}$$

718 and the current $F_t$ 708, the previously described motion estimation (ME) block 720 to output the motion feature $$\hat{F}_t^{m_i}$$

722. The motion feature $$\hat{F}_t^{m_i}$$

722 is inputted into the predictor generation (PG) block 724 to generate the predicted feature $$F_t^{Pi}$$

726 at current from t. Multiple predicted featured $$F_t^{P1}, \ldots, F_t^{Pi}, \ldots, F_t^{PN}$$

may be generated from $F_{t-1}, \ldots, F_{t-i}, \ldots, F_{t-N}$ by iteratively warping a feature up to time t−1, then outputting predicted features $$F_{t-1}^{P1}, \ldots, F_{t-1}^{Pi}, \ldots, F_{t-1}^{PN},$$

respectively.

These warped predicted features may represent the reference features at time t−1. These so-called refined reference features may contain additional motion history through the warping iterations. Compared to processing just motion estimation from a reference frame.at time t−1, these warped predicted features may estimated include additional information with finer motion details. The motion feature $$\hat{F}_t^{m1}, \ldots, \hat{F}_t^{mi}, \ldots, \hat{F}_t^{mN}$$

estimated from each warped predicted feature $$F_{t-1}^{P1}, \ldots, F_{t-1}^{Pi}, \ldots, F_{t-1}^{PN}$$

may be packed into motion bitstreams.

Feature Merging

Figure 8:
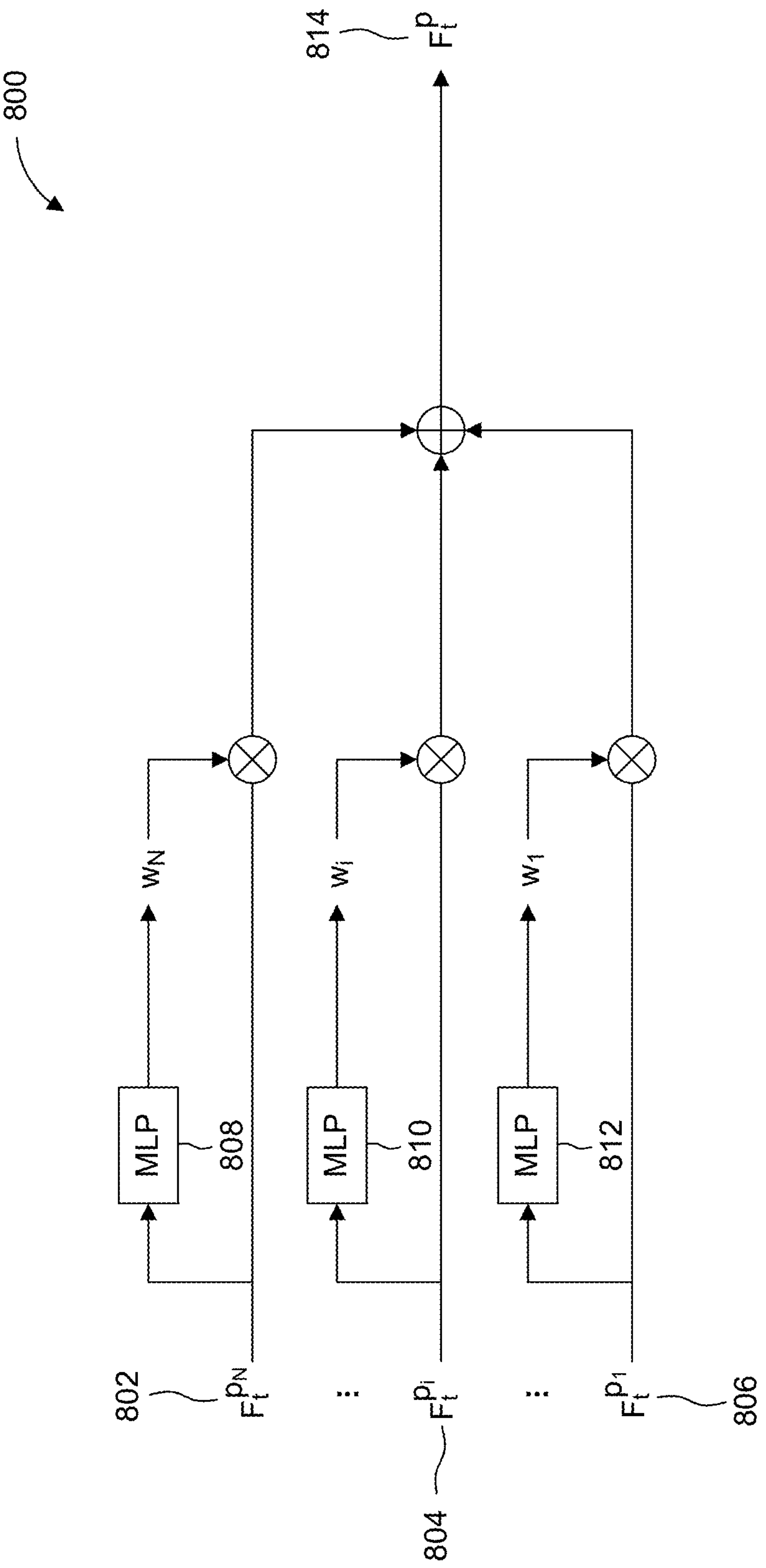
FIG. 8 is a process diagram illustrating an example process for feature merging by weights learning according to some embodiments.

FIG. 8 is a process diagram illustrating an example process for feature merging by weights learning according to some embodiments. A PG block may generate N predicted features $$\left(F_t^{P1}, \ldots, F_t^{Pi}, \ldots, F_t^{PN}\right).$$

In some embodiments, N PG blocks may generate N predicted features. As shown in the example architecture 800 of FIG. 8, each of these predicted features $$F_t^{P1}, \ldots, F_t^{Pi}, \ldots, F_t^{PN}$$

(806, 804, 802) represents a predicted feature based on an i-th reference feature $F_{t-i}$. Because each reference feature is extracted from a unique set of points, each reference feature may be used to estimate a unique motion of the current frame feature. With these unique motion features, the predicted features are generated. These N multiple predicted features may be enhanced by merging them for some embodiments. Some merging examples are described in the following sub-sections.

Weighted Averaging

For some embodiments, the weighting coefficients across the predicted features may be 1/N for each predicted feature. For some other embodiments, weighting parameters may be learnt at training time. This array of weighting parameters may be determined during the training. For some embodiments, as illustrated in the example architecture 800 of FIG. 8, multiple multi-layer perceptrons (MLP) 808, 810, 812 may be learnt to estimate an array of weighting parameters from a given feature map $$F_t^{Pi}.$$

The corresponding weighting parameter $w_i$ may estimate a single weight value. In another embodiment, $w_i$ may be a vector of weights with a weight defined per channel. Each of the estimated weighting parameters, $w_1, \ldots, w_i, \ldots, w_N$ are multiplied (⊗) by the corresponding feature map $$F_t^{P1}, \ldots, F_t^{Pi}, \ldots, F_t^{PN},$$

respectively. The weights multiplied feature maps are then added (⊕) to generate an enhanced predicted feature $$F_t^P$$

814.

Feature Mixing

Figure 9:
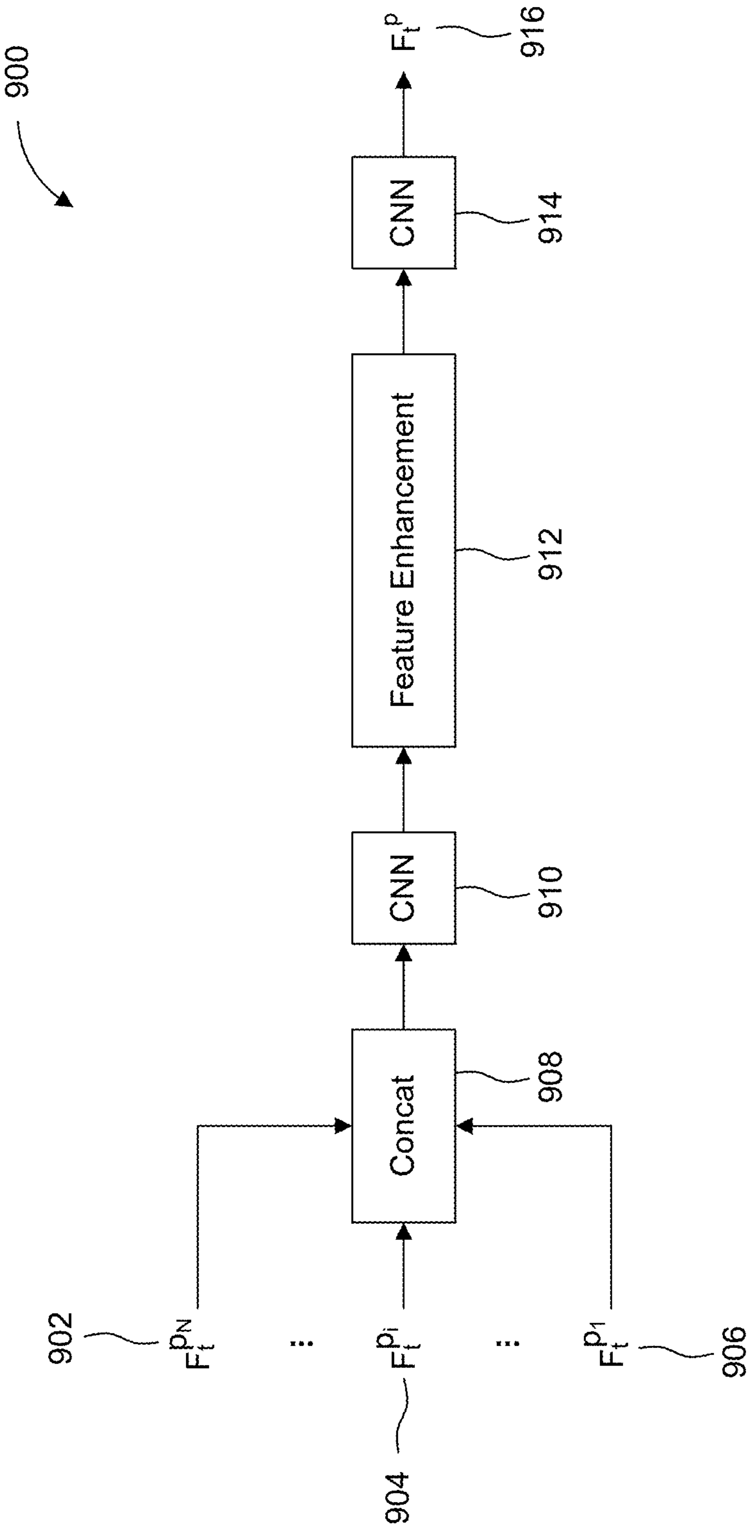
FIG. 9 is a process diagram illustrating an example process for feature merging by concatenation and feature enhancement according to some embodiments.

FIG. 9 is a process diagram illustrating an example process for feature merging by concatenation and feature enhancement according to some embodiments. Feature merging may be achieved by a concatenation block 908 concatenating the feature map $$F_t^{P1}$$

(906), . . . , $$F_t^{Pi}$$

(904), . . . , $$F_t^{PN}$$

(902). A series of CNN layers 910 may follow to embed the concatenated feature and to adapt to the channel dimension followed by neural network (NN) blocks. For some embodiments, as shown in the example architecture 900 of FIG. 9, a feature enhancement block 912 may follow additionally to further improve the concatenated features with feature enhancement block. For some embodiments, a weighted average instead of a concatenation may be used. Pruning after the feature enhancement 912 may be required if the point coordinates across the $$F_t^{P1}(906), \ldots, F_t^{Pi}$$

(904), . . . , $$F_t^{PN}$$

(906) features are not identical. For some embodiments, a second series of CNN layers 914 may follow the feature enhancement block 912. The second series of CNN layers may output an enhanced predicted feature $$F_t^P$$

916.

Reference Feature Merging

Figure 10:
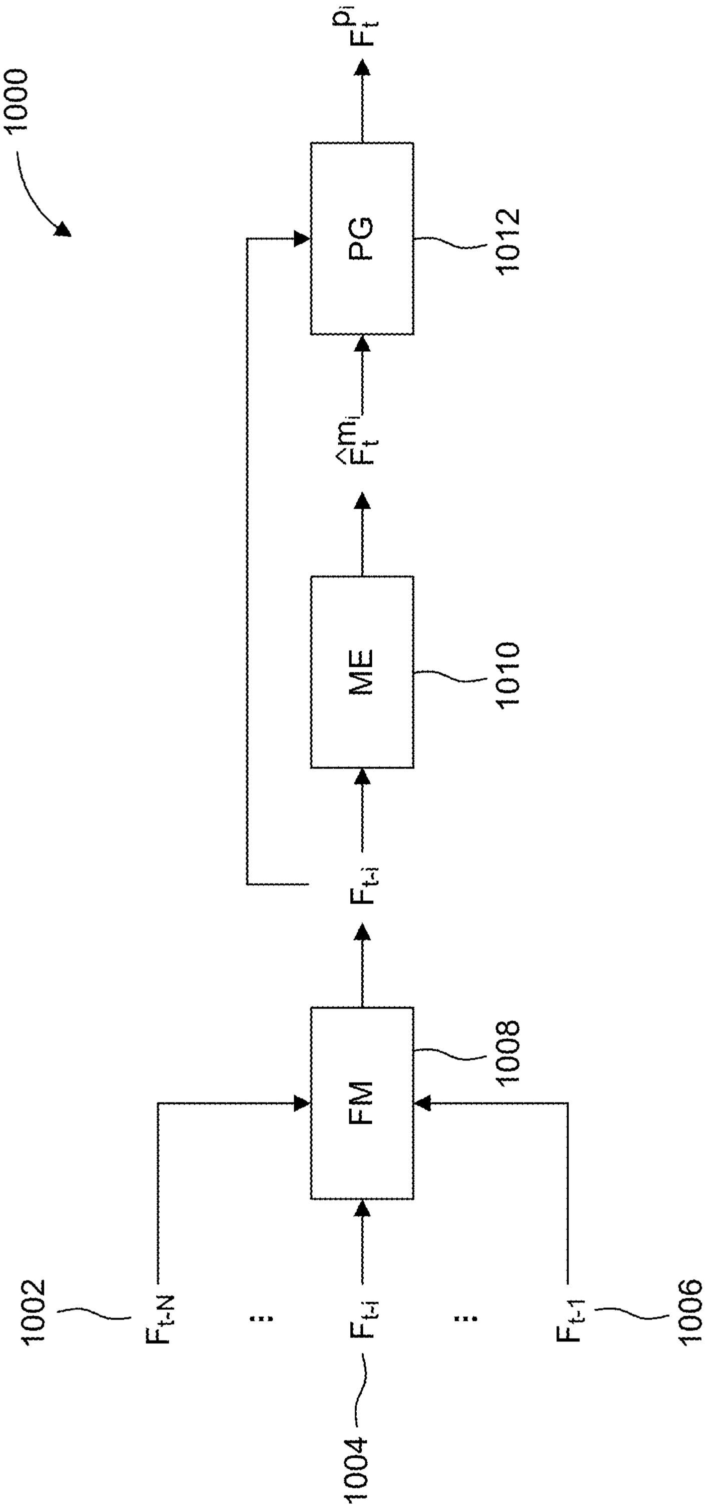
FIG. 10 is a process diagram illustrating an example process for reference feature merging according to some embodiments.

FIG. 10 is a process diagram illustrating an example process for reference feature merging according to some embodiments. To streamline the coding complexity, some embodiments may merge features at an earlier stage before the motion estimation and then generate only one motion bitstream. As illustrated in the example architecture 1000 of FIG. 10, the Feature Merging (FM) block 1008 takes reference features $F_{t-1}$ (1006), . . . , $F_{t-i}$ (1004), . . . , $F_{t-N}$ (1002) as inputs. The merged reference feature $F_{t-i}$ is then processed in a single reference track. The ME block 1010 and the PG block 1012 may be similar to the $F_{t-i}$ feature motion estimation branch. During the decoding stage, for some embodiments, the same FM block may be applied to the multiple reference features and may be paired with decoded motion feature to predict current feature.

Dynamic PCC Decoder with Multiple Reference Frames

Figure 11A:
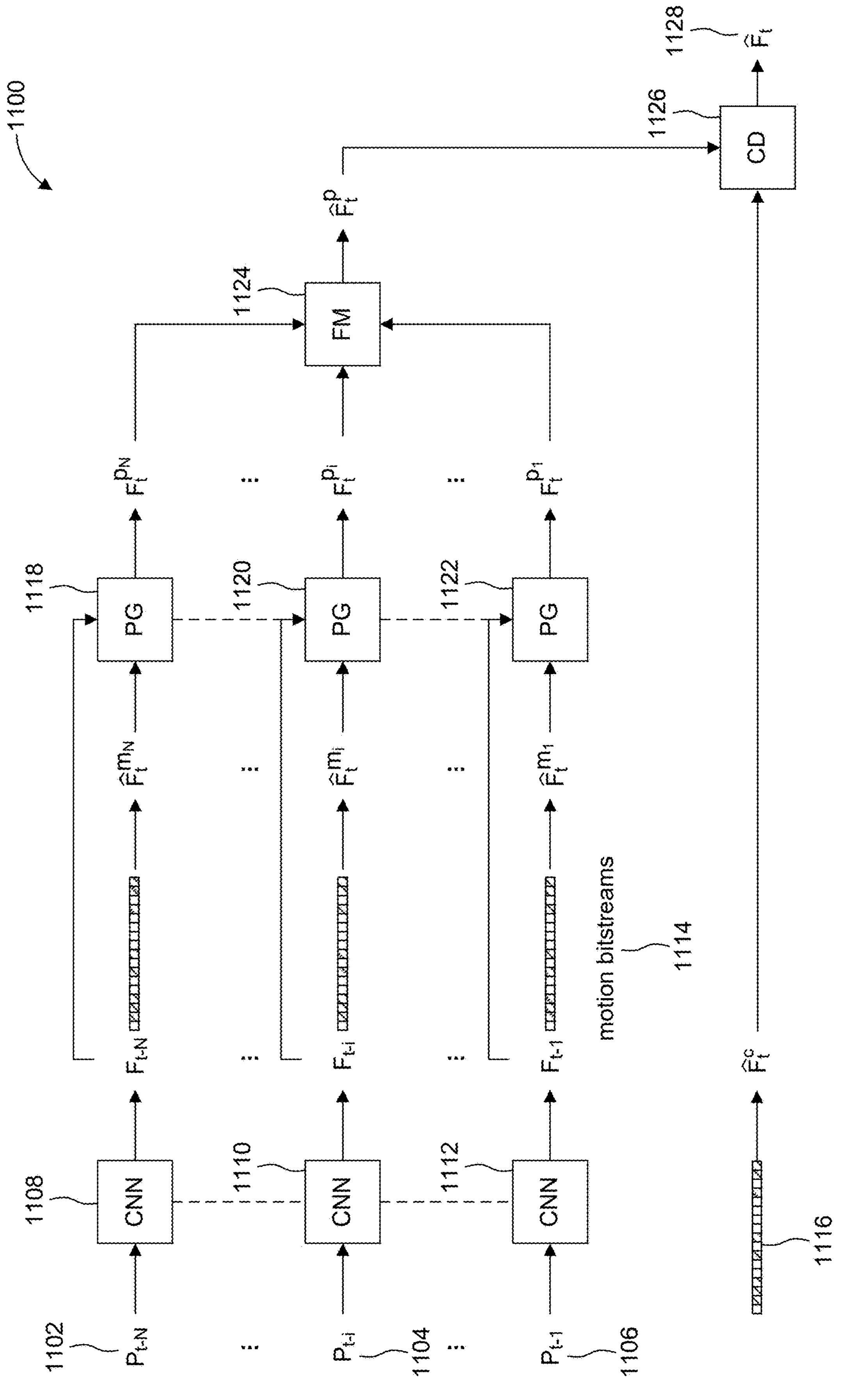
FIG. 11A is a process diagram illustrating an example DPCC decoder architecture with multiple reference frames for dense point clouds according to some embodiments.
Figure 11B:
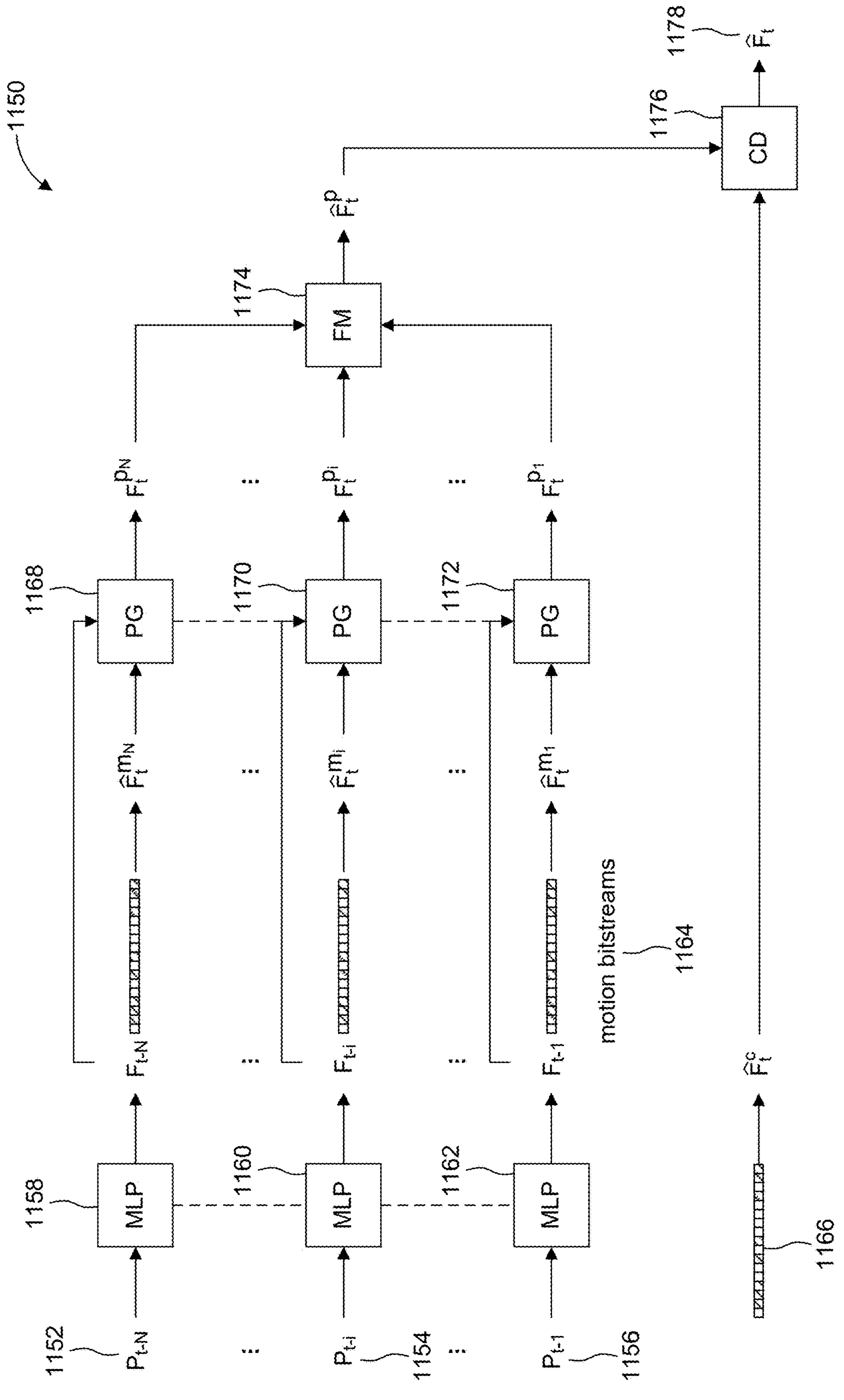
FIG. 11B is a process diagram illustrating an example DPCC decoder architecture with multiple reference frames for sparse point clouds according to some embodiments.

FIG. 11A is a process diagram illustrating an example DPCC decoder architecture with multiple reference frames for dense point clouds according to some embodiments. FIG. 11B is a process diagram illustrating an example DPCC decoder architecture with multiple reference frames for sparse point clouds according to some embodiments. In the encoding stage, for some embodiments, multiple motion features may be entropy encoded and then packed into N motion bitstreams. As illustrated in the example architectures 1100, 1150 of FIGS. 11A and 11B, during the decoding stage, multiple motion bitstreams 1114, 1164 may be entropy decoded to form N motion features:

$$\hat{F}_t^{m1}, \ldots, \hat{F}_t^{mi}, \ldots, \hat{F}_t^{mN}.$$

These decoded motion features are identical to the outputs of the ME block, which assist the training process better understand the motion coding process. Like the previous CNN, ME, and PG blocks, the entropy encoding or decoding blocks may be either shared or not shared for some embodiments.

Motion Compensation

In parallel, the N previously reconstructed reference frames are accessible from the decoder, and CNN blocks 1112, 1110, 1108, 1162, 1160, 1158 may be used to extract the down-sampled reference features $F_{t-1}, \ldots, F_{t-i}, \ldots, F_{t-N}$ from each corresponding reference frame 1106, 1104, 1102, 1156, 1154, 1152. Similar to the encoding steps, a reference feature $F_{t-i}$ and the corresponding motion feature $$\hat{F}_t^{m_i}$$

is inputted to a PG block 1118, 1120, 1122, 1168, 1170, 1172 to generate a predicted feature $$F_t^{p_i}.$$

Like the encoder framework, the N predicted features $$F_t^{p1}, \ldots, F_t^{pi}, \ldots, F_t^{pN}$$

may be merged through the feature merging (FM) block 1124, 1174 and output a single $$F_t^p.$$

This process may refer to a multiple motion compensation in a feature domain.

Point Cloud Reconstruction

This predicted feature is identical to the one generated from the encoder and may be served as one of the conditions for generating the reconstructed current feature $\hat{F}_t$ 1128, 1178 through a conditional decoder (CD). For some embodiments, the CD block 1126, 1176 may be designed like FIG. 4. That reconstructed current feature map defined on down-sampled points may be inputted into a series of CNN layers with up-sampling block to finally reconstruct the point cloud. In FIG. 11A, for some embodiments, the CNN layers typically work well for denser point clouds. In some embodiments for sparser point clouds, the CNN layers 1108, 1110, 1112 may be replaced by MLP layers 1158, 1160, 1162 for more efficient reconstruction (see FIG. 11B). For some embodiments, the arithmetically decoded feature $$\hat{F}_t^c$$

1116, 1166 for the current point cloud frame may be inputted into the conditional decoder 1126, 1176.

Feature Warped Decoding

Figure 12:
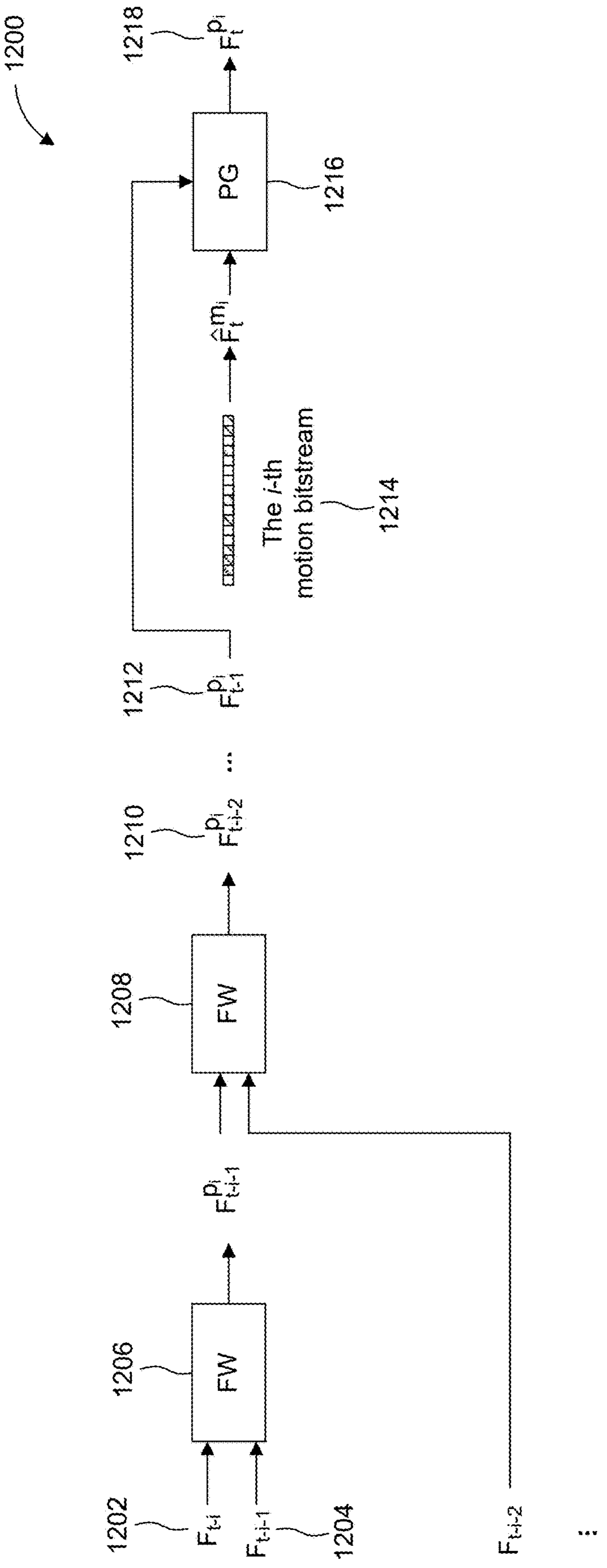
FIG. 12 is a process diagram illustrating an example series of feature warping blocks for decoding predicted features according to some embodiments.

FIG. 12 is a process diagram illustrating an example series of feature warping blocks for decoding predicted features according to some embodiments. As shown in the example architecture 1200 of FIG. 12, the i-th predicted feature may be estimated through a series of feature warping blocks 1206, 1208. From the i-th reference frame feature $F_{t-i}$ 1202, an additional reference feature at the next time frame $F_{t-i-1}$ 1204 is inputted to the feature warping (FW) block 1206 to generate a predicted feature $$F_{t-i-1}^{pi}.$$

This predicted feature, which may be considered as a motion embedded next reference frame feature, is inputted to the next feature warping block 1208 along with an additional reference feature $F_{t-i-2}$ to generate a feature $$F_{t-i-2}^{pi}$$

1210. This series of FW blocks 1206, 1208 is processed until the reference feature $F_{t-1}$ is inputted to the last FW block. A predicted feature $$F_{t-1}^{pi}$$

1212 is generated, ad this predicted feature along with decoded motion feature $$\hat{F}_t^{m_i}$$

from the i-th motion bitstream 1214 are inputted to a predictor generation (PG) block 1216 to estimate the current frame feature 1218. This process may be done in parallel for all N motion bitstreams. Then one of the previously described feature merging methods may be used to refine the predicted features.

Training Strategies

Predicted Feature Supervision

Figure 13:
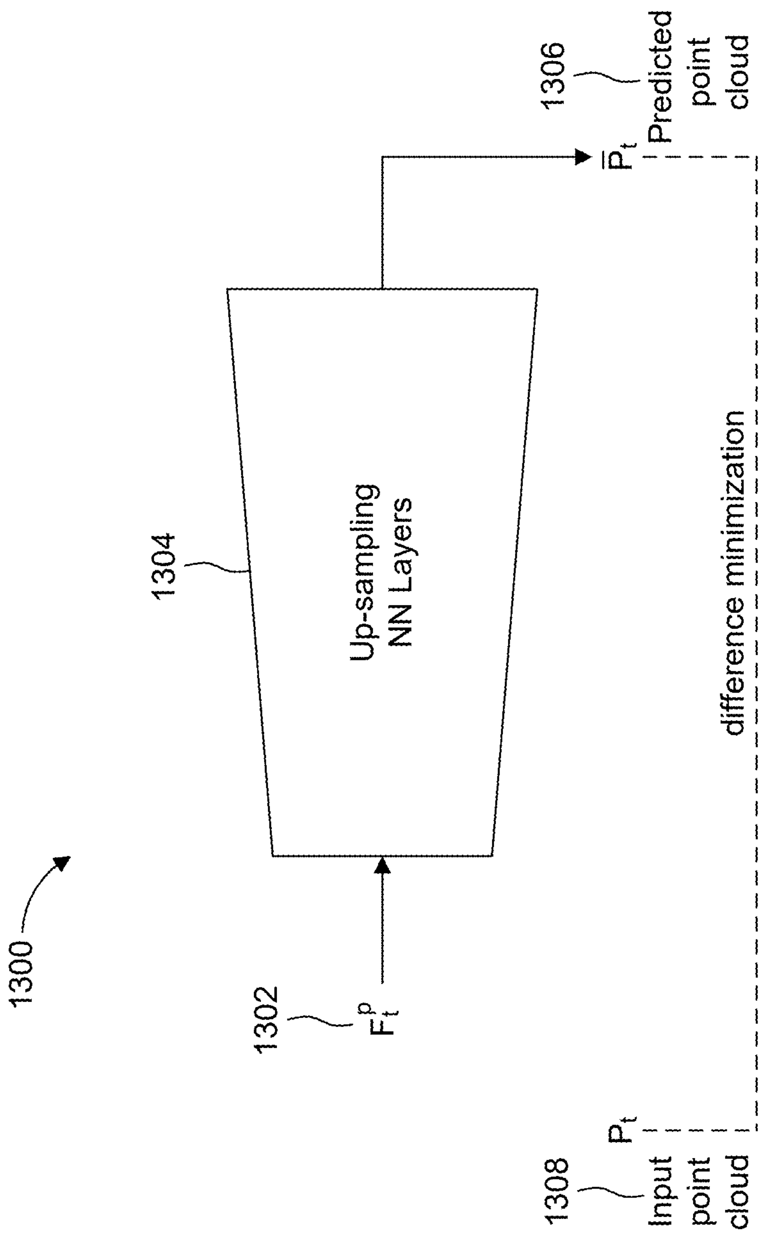
FIG. 13 is a process diagram illustrating an example predicted feature supervision process according to some embodiments.

FIG. 13 is a process diagram illustrating an example predicted feature supervision process according to some embodiments. To make predicted feature easier to reconstruct point cloud, a supervision technique may be applied to the training stage for some embodiments. On the decoder side, the example architecture 1300 may be used. A predicted feature $$F_t^p$$

1302 may be inputted to a series or up-sampling NN layers 1304 to predict point cloud $\bar{P}_t$ 1306. During training, these reconstructed points may be supervised by minimizing the difference between $\hat{P}_t$ and its original input point cloud $P_t$ 1308. For some embodiments, each predicted feature $$F_t^{p1}, \ldots, F_t^{pi}, \ldots, F_t^{pN}$$

may be supervised independently before merging them.

Some embodiments of an example method may include performing a predicted feature supervision process to minimize differences between an input point cloud and a predicted point cloud.

Motion Feature Supervision

For some embodiments, motion feature may be supervised in an earlier stage before predicting the current feature. For some embodiments, the ground truth motion vectors may be pre-processed to compare with predicted motion vectors. The motion vectors may be predicted with the similar up-sampling process as in FIG. 13. The up-sampling NN layers predicts motion vectors instead of points. The same difference minimization is computed between the ground truth motion vectors and the predicted motion vectors.

A predictive geometry coding with a single reference frame may lack fine motion detail when compressing motion in a feature space. Extending the time window allows the compression system to better understand motion history, thus helpful to generate higher quality predicted feature. In this application, we introduce a new dynamic point cloud compression framework which generates multiple predicted features from different time windows via multiple reference frames. The multiple predicted features are then merged to generate a finetuned predicted feature for high quality point cloud reconstruction.

Figure 14:
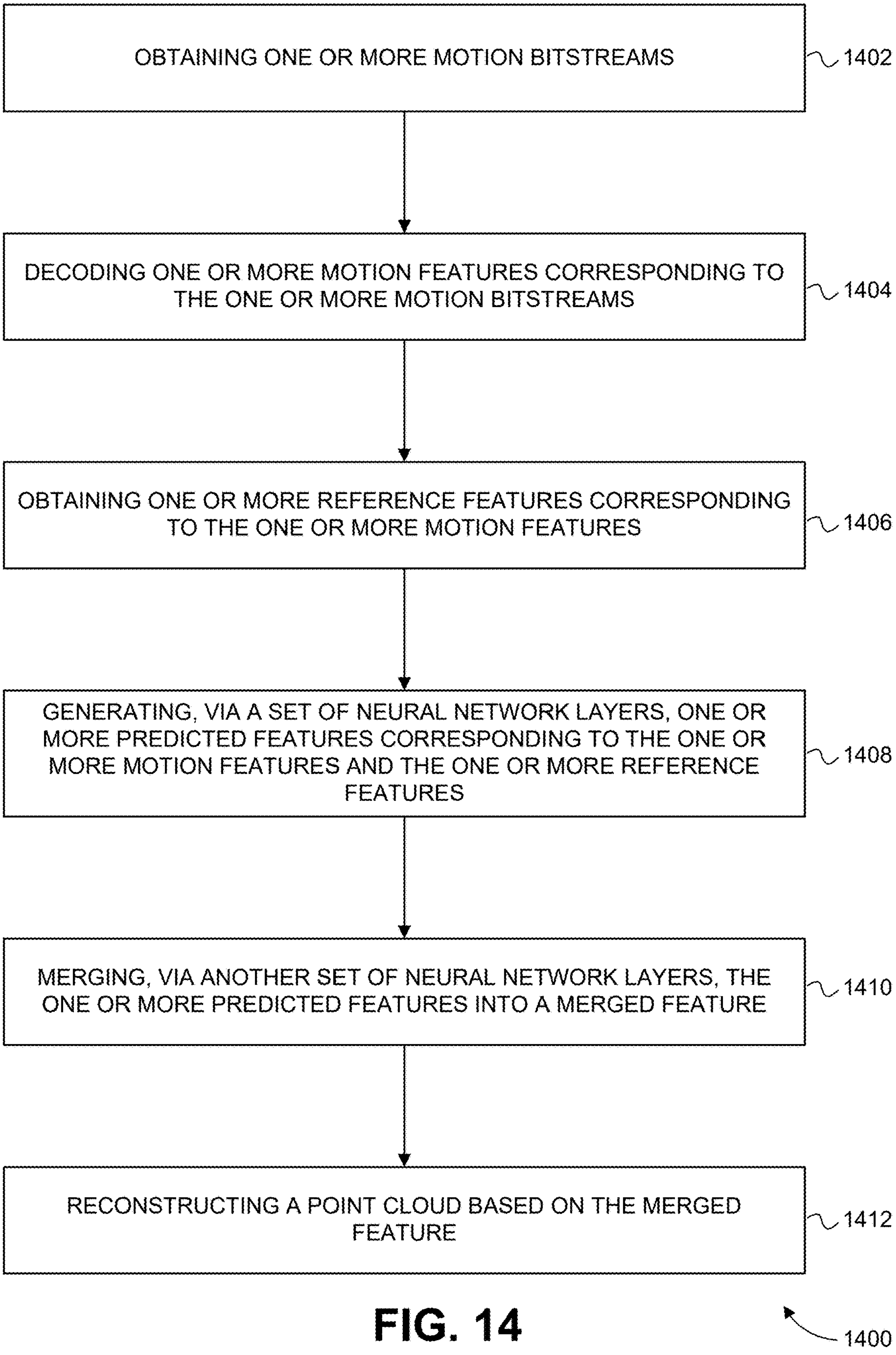
FIG. 14 is a flowchart illustrating an example process for decoding a current feature of a point cloud according to some embodiments.

FIG. 14 is a flowchart illustrating an example process for decoding a current feature of a point cloud according to some embodiments. For some embodiments, an example process 1400 may include obtaining 1402 one or more motion bitstreams. For some embodiments, the example process 1400 may further include decoding 1404 one or more motion features corresponding to the one or more motion bitstreams. For some embodiments, the example process 1400 may further include obtaining 1406 one or more reference features corresponding to the one or more motion features. For some embodiments, the example process 1400 may further include generating 1408, via a set of neural network layers, one or more predicted features corresponding to the one or more motion features and the one or more reference features. For some embodiments, the example process 1400 may further include merging 1410, via another set of neural network layers, the one or more predicted features into a merged feature. For some embodiments, the example process 1400 may further include reconstructing 1412 a point cloud based on the merged feature.

Figure 15:
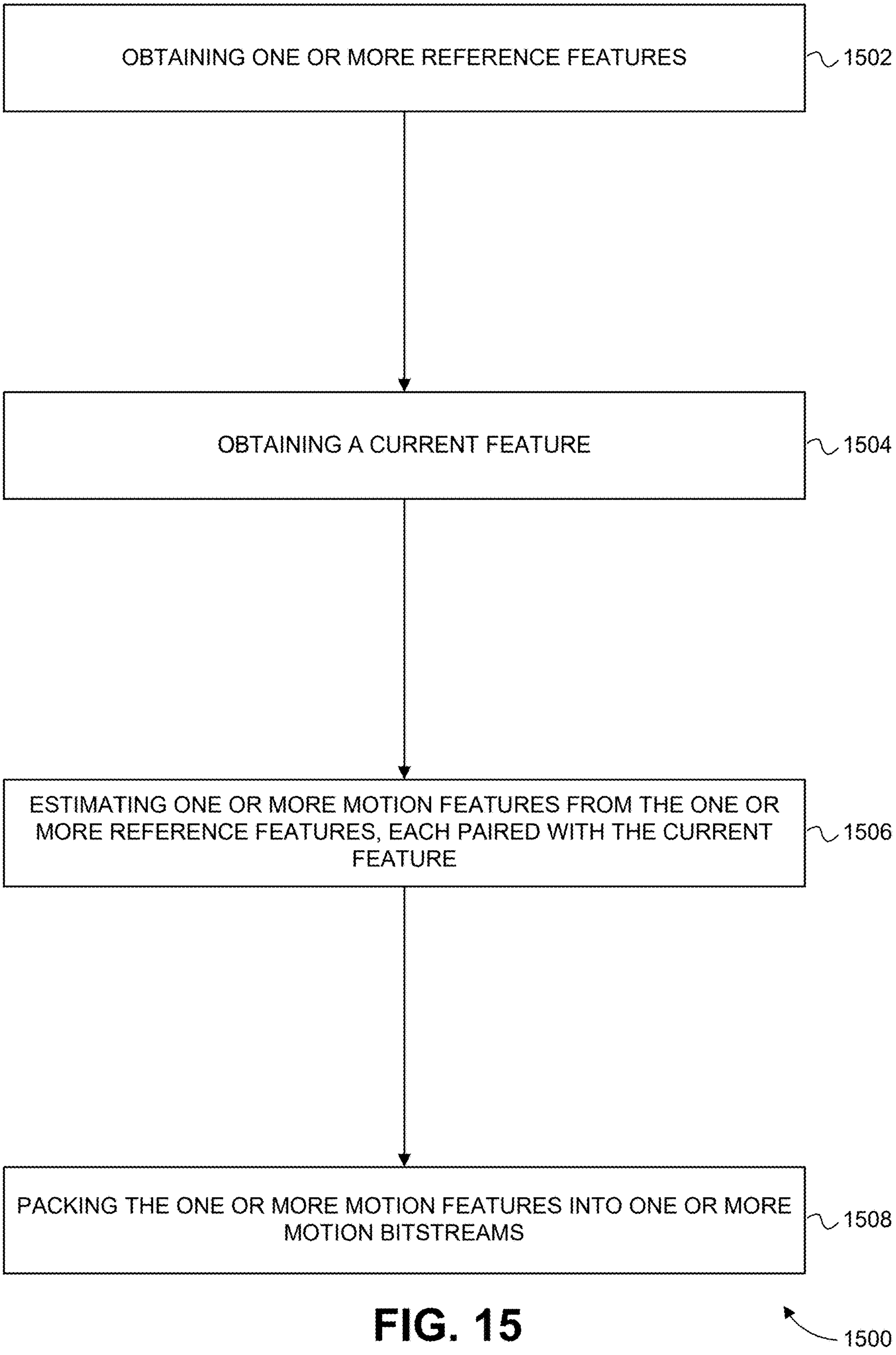
FIG. 15 is a flowchart illustrating an example process for encoding a current feature of a point cloud according to some embodiments.

FIG. 15 is a flowchart illustrating an example process for encoding a current feature of a point cloud according to some embodiments. For some embodiments, an example process 1500 may include obtaining 1502 one or more reference features. For some embodiments, the example process 1500 may further include obtaining 1504 a current feature. For some embodiments, the example process 1500 may further include estimating 1506 one or more motion features from the one or more reference features, each paired with the current feature. For some embodiments, the example process 1500 may further include packing 1508 the one or more motion features into one or more motion bitstreams.

An example apparatus in accordance with some embodiments may include at least one processor configured to perform any one of the methods described within this application. An example apparatus in accordance with some embodiments may include a computer-readable medium storing instructions for causing one or more processors to perform any one of the methods described within this application. An example apparatus in accordance with some embodiments may include at least one processor and at least one non-transitory computer-readable medium storing instructions for causing the at least one processor to perform any one of the methods described within this application. An example signal in accordance with some embodiments may include a bitstream generated according to any one of the methods described within this application.

While the methods and systems in accordance with some embodiments are generally discussed in context of extended reality (XR), some embodiments may be applied to any XR contexts such as, e.g., virtual reality (VR)/mixed reality (MR)/augmented reality (AR) contexts. Also, although the term "head mounted display (HMD)" is used herein in accordance with some embodiments, some embodiments may be applied to a wearable device (which may or may not be attached to the head) capable of, e.g., XR, VR, AR, and/or MR for some embodiments.

A first example method in accordance with some embodiments may include: obtaining one or more motion bitstreams; decoding one or more motion features corresponding to the one or more motion bitstreams; obtaining one or more reference features corresponding to the one or more motion features; generating, via a set of neural network layers, one or more predicted features corresponding to the one or more motion features and the one or more reference features; merging, via another set of neural network layers, the one or more predicted features into a merged feature; and reconstructing a point cloud based on the merged feature.

For some embodiments of the first example method, decoding the one or more motion features includes entropy decoding the one or more motion bitstreams to form, respectively, the one or more motion features.

For some embodiments of the first example method, generating the one or more predicted features includes: inputting the one or more motion features and the one or more reference features into a predictor generation process; and outputting, via the predictor generation process, the one or more predicted features.

For some embodiments of the first example method, merging the one or more predicted features into the merged feature includes: weighting the one or more predicted features; and adding the weighted one or more predicted features to generate the merged feature.

For some embodiments of the first example method, merging the one or more predicted features into the merged feature includes: concatenating the one or more predicted features; passing the concatenated predicted features through a first neural network to generate a set of embedded features; passing the embedded features through a feature enhancement process to generate a set of enhanced features; and passing the set of enhanced features through a second neural network to generate the merged feature.

Some embodiments of the first example method may further include performing a pruning process on the set of enhanced features.

For some embodiments of the first example method, reconstructing the point cloud based on the merged feature includes passing the merged feature as condition for a conditional decoder to generate the reconstructed point cloud.

Some embodiments of the first example method may further include performing feature warping on at least one of the one or more reference features.

A first example apparatus in accordance with some embodiments may include: a processor; and a memory storing instructions operative, when executed by the processor, to cause the apparatus to: obtain one or more motion bitstreams; decode one or more motion features corresponding to the one or more motion bitstreams; obtain one or more reference features corresponding to the one or more motion features; generate, via a set of neural network layers, one or more predicted features corresponding to the one or more motion features and the one or more reference features; merge, via another set of neural network layers, the one or more predicted features into a merged feature; and reconstruct a point cloud based on the merged feature.

A second example method in accordance with some embodiments may include: obtaining one or more reference features; obtaining a current feature; estimating one or more motion features from the one or more reference features, each paired with the current feature; and packing the one or more motion features into one or more motion bitstreams.

Some embodiments of the second example method may further include: generating, via a set of neural network layers, one or more predicted features corresponding to the one or more motion features and the one of more reference features; and merging, via another set of neural network layers, the one or more predicted features into a merged feature.

For some embodiments of the second example method, generating the one or more predicted features includes: inputting the one or more motion features and the one or more reference features into a predictor generation process; and outputting, via the predictor generation process, the one or more predicted features.

For some embodiments of the second example method, merging the one or more predicted features into the merged feature includes: weighting the one or more predicted features; and adding the weighted one or more predicted features to generate the merged feature.

For some embodiments of the second example method, merging the one or more predicted features into the merged feature includes: concatenating the one or more predicted features; passing the concatenated predicted features through a first neural network to generate a set of embedded features; passing the embedded features through a feature enhancement process to generate a set of enhanced features; and passing the set of enhanced features through a second neural network to generate the merged feature.

Some embodiments of the second example method may further include performing a pruning process on the set of enhanced features.

Some embodiments of the second example method may further include conditionally encoding a current point cloud frame using the merged feature as a condition.

For some embodiments of the second example method, estimating the one or more motion features from the one or more reference features includes: inputting the current feature and a respective feature of the one or more reference features through a corresponding one or more motion estimation processes; and outputting the one or more motion features by the corresponding one or more motion estimation processes.

For some embodiments of the second example method, obtaining the one or more reference features includes merging two or more of the reference features.

Some embodiments of the second example method may further include performing feature warping on at least one of the one or more reference features.

For some embodiments of the second example method, performing feature warping includes: estimating one or more warped motion features from the one or more reference features; and generating the one or more warped reference features corresponding to the one or more warped motion features.

One or more embodiments provide a computer program comprising instructions which when executed by one or more processors cause such processors to perform the encoding and/or decoding methods according to any of the embodiments described above. One or more embodiments also provide a computer readable storage medium having stored thereon instructions for encoding or decoding video data according to the methods described above.

One or more embodiments provide a computer readable storage medium having stored thereon video data generated according to the methods described above. One or more embodiments also provide a method and apparatus for transmitting or receiving video data generated according to the methods described above.

The embodiments described herein may be implemented in, for example, a method or a process, an apparatus, a software program, a data stream, or a signal. Even if only discussed in the context of a single form of implementation (e.g., as a method), the implementation of such features may also be implemented in other forms. An apparatus may be implemented in, for example, appropriate hardware, software, and firmware. Corresponding methods may be implemented in, for example, a processor.

Various numeric values are used in the present application. Such specific values are for example purposes and the embodiments described are not limited to these specific values.

Various methods are described herein, and such methods comprise one or more steps or actions for achieving the described method. Unless a specific order of steps or actions is required for the proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an order to the operations unless specifically required.

The present disclosure may refer to "determining" various pieces of information. Determining information may include one or more of, for example, estimating, calculating, predicting, or retrieving (e.g., from memory) the information.

The present disclosure may refer to "accessing" various pieces of information. Accessing information may include one or more of, for example, receiving, retrieving (e.g., from memory), storing, moving, copying, calculating, determining, predicting, or estimating the information. Similarly, the present disclosure may refer to "receiving" various pieces of information. Receiving information may include one or more of, for example, accessing or retrieving (e.g., from memory) the information.

It is to be understood that use of any of the following "/", "and/or", and "at least one of" is intended to encompass all possible selections of listed items, taken either individually or in any combination thereof.

While specific embodiments have been described in the foregoing description in connection with the accompanying drawings, it should be understood that embodiments described herein are examples only and should not be taken as limiting the scope of the present disclosure or the following claims. Although features and elements are described herein in particular combinations, those of ordinary skill in the art will appreciate that such features or elements may be used alone or in any combination with the other features and elements. It is understood, therefore, that the overall teachings of the present disclosure are not limited to the particular embodiments, implementations, and examples disclosed herein, but are intended to cover variations, modifications, and alternatives as defined by the appended claims and any and all equivalents thereof.

This disclosure describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the disclosure or scope of those aspects. Indeed, all of the different aspects can be combined and interchanged to provide further aspects. Moreover, the aspects can be combined and interchanged with aspects described in earlier filings as well.

Various numeric values may be used in the present disclosure, for example. The specific values are for example purposes and the aspects described are not limited to these specific values.

Embodiments described herein may be carried out by computer software implemented by a processor or other hardware, or by a combination of hardware and software. As a non-limiting example, the embodiments can be implemented by one or more integrated circuits. The processor can be of any type appropriate to the technical environment and can encompass one or more of microprocessors, general purpose computers, special purpose computers, and processors based on a multi-core architecture, as non-limiting examples.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this disclosure are not necessarily all referring to the same embodiment.

Additionally, this disclosure may refer to "determining" various pieces of information. Determining the information can include one or more of, for example, estimating the information, calculating the information, predicting the information, or retrieving the information from memory.

Further, this disclosure may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this disclosure may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items as are listed.

Implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method, comprising:
obtaining multiple reference frames;
obtaining one or more motion bitstreams;
decoding one or more motion features corresponding to the one or more motion bitstreams;
obtaining multiple reference features based on the multiple reference frames;
generating, via a set of neural network layers, multiple predicted features corresponding to the one or more motion features and the multiple reference features;
merging, via another set of neural network layers, the multiple predicted features into a merged feature; and
reconstructing a point cloud based on the merged feature, wherein reconstructing the point cloud based on the merged feature comprises passing the merged feature as a condition for a conditional decoder to generate the reconstructed point cloud.

2. The method of claim 1, wherein decoding the one or more motion features comprises entropy decoding the one or more motion bitstreams to form, respectively, the one or more motion features.

3. The method of claim 1, wherein generating the multiple predicted features comprises:
inputting the one or more motion features and the multiple reference features into a predictor generation process; and
outputting, via the predictor generation process, the multiple predicted features.

4. The method of claim 1, wherein merging the multiple predicted features into the merged feature comprises:
weighting the multiple predicted features; and
adding the weighted multiple predicted features to generate the merged feature.

5. The method of claim 1, wherein merging the multiple predicted features into the merged feature comprises:
concatenating the multiple predicted features;
passing the concatenated multiple predicted features through a first neural network to generate a set of embedded features;
passing the embedded features through a feature enhancement process to generate a set of enhanced features; and
passing the set of enhanced features through a second neural network to generate the merged feature.

6. The method of claim 5, further comprising performing a pruning process on the set of enhanced features.

7. The method of claim 1, further comprising performing feature warping on at least one of the multiple reference features.

8. An apparatus comprising:
a processor; and
a memory storing instructions operative, when executed by the processor, to cause the apparatus to:
obtain multiple reference frames;
obtain one or more motion bitstreams;
decode one or more motion features corresponding to the one or more motion bitstreams;
obtain multiple reference features based on the multiple reference frames;
generate, via a set of neural network layers, multiple predicted features corresponding to the one or more motion features and the multiple reference features;
merge, via another set of neural network layers, the multiple predicted features into a merged feature; and
reconstruct a point cloud based on the merged feature.

9. A method, comprising:
obtaining multiple reference frames;
obtaining multiple reference features based on the multiple reference frames;
obtaining a current feature;
estimating one or more motion features from the multiple reference features, each paired with the current feature;
generating, via a set of neural network layers, multiple predicted features corresponding to the one or more motion features and the multiple reference features;
merging, via another set of neural network layers, the multiple predicted features into a merged feature;
conditionally encoding a current point cloud frame using the merged feature as a condition; and
packing the one or more motion features into one or more motion bitstreams.

10. The method of claim 9, wherein generating the multiple predicted features comprises:
inputting the one or more motion features and the multiple reference features into a predictor generation process; and
outputting, via the predictor generation process, the multiple predicted features.

11. The method of claim 9, wherein merging the multiple predicted features into the merged feature comprises:
weighting the multiple predicted features; and
adding the weighted multiple predicted features to generate the merged feature.

12. The method of claim 9, wherein merging the multiple predicted features into the merged feature comprises:
concatenating the multiple predicted features;
passing the concatenated multiple predicted features through a first neural network to generate a set of embedded features;
passing the embedded features through a feature enhancement process to generate a set of enhanced features; and
passing the set of enhanced features through a second neural network to generate the merged feature.

13. The method of claim 12, further comprising performing a pruning process on the set of enhanced features.

14. The method of claim 9, wherein estimating the one or more motion features from the multiple reference features comprises:
inputting the current feature and a respective feature of the multiple reference features through a corresponding one or more motion estimation processes; and
outputting the one or more motion features by the corresponding one or more motion estimation processes.

15. The method of claim 9, wherein obtaining the multiple reference features comprises merging two or more of the reference features.

16. The method of claim 9, further comprising performing feature warping on at least one of the multiple reference features.

17. The method of claim 16, wherein performing feature warping comprises:

estimating one or more warped motion features from the multiple reference features; and generating the one or more warped reference features corresponding to the one or more warped motion features.

18. An apparatus comprising:

a processor; and a memory storing instructions operative, when executed by the processor, to cause the apparatus to:

obtain multiple reference frames;

obtain multiple reference features based on the multiple reference frames;

obtain a current feature;

estimate one or more motion features from the multiple reference features, each paired with the current feature;

generate, via a set of neural network layers, multiple predicted features corresponding to the one or more motion features and the multiple reference features;

merge, via another set of neural network layers, the multiple predicted features into a merged feature;

conditionally encode a current point cloud frame using the merged feature as a condition; and pack the one or more motion features into one or more motion bitstreams.

19. A method, comprising:

obtaining multiple reference frames;

obtaining one or more motion bitstreams;

decoding one or more motion features corresponding to the one or more motion bitstreams;

obtaining multiple reference features based on the multiple reference frames;

generating, via a set of neural network layers, multiple predicted features corresponding to the one or more motion features and the multiple reference features;

merging, via another set of neural network layers, the multiple predicted features into a merged feature, wherein merging the multiple predicted features into the merged feature comprises:

weighting the multiple predicted features; and adding the weighted multiple predicted features to generate the merged feature; and reconstructing a point cloud based on the merged feature.

20. A method, comprising:

obtaining multiple reference frames;

obtaining multiple reference features based on the multiple reference frames;

obtaining a current feature;

estimating one or more motion features from the multiple reference features, each paired with the current feature;

generating, via a set of neural network layers, multiple predicted features corresponding to the one or more motion features and the multiple reference features;

merging, via another set of neural network layers, the multiple predicted features into a merged feature, wherein merging the multiple predicted features into the merged feature comprises:

weighting the multiple predicted features; and adding the weighted multiple predicted features to generate the merged feature; and packing the one or more motion features into one or more motion bitstreams.

* * * * *